United States Patent
Yerramalli et al.

(10) Patent No.: US 10,512,033 B2
(45) Date of Patent: Dec. 17, 2019

(54) TIMING INFORMATION FOR DISCOVERY IN UNLICENSED SPECTRUM

(71) Applicant: QUALCOMM Incorporated, San Diego, CA (US)

(72) Inventors: Srinivas Yerramalli, San Diego, CA (US); Tao Luo, San Diego, CA (US); Aleksandar Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 15/009,730

(22) Filed: Jan. 28, 2016

(65) Prior Publication Data
US 2016/0227476 A1  Aug. 4, 2016

Related U.S. Application Data

(60) Provisional application No. 62/109,504, filed on Jan. 29, 2015.

(51) Int. Cl.
*H04L 5/00* (2006.01)
*H04L 27/00* (2006.01)
(Continued)

(52) U.S. Cl.
CPC .......... *H04W 48/16* (2013.01); *H04L 5/0053* (2013.01); *H04L 27/0006* (2013.01);
(Continued)

(58) Field of Classification Search
CPC ..... H04W 16/14; H04W 24/08; H04W 28/26; H04W 48/08; H04W 48/16; H04W 56/00;
(Continued)

(56) References Cited

U.S. PATENT DOCUMENTS 8,520,619 B2 *  8/2013  Hong .................... H04L 5/0053
                                                          370/329
8,817,686 B2 *  8/2014  Cai ....................... H04B 7/2606
                                                          370/315
(Continued)

FOREIGN PATENT DOCUMENTS

AU     2015305889 A1    2/2017
CN      103765824 A     4/2014
(Continued)

OTHER PUBLICATIONS

Samsung, Discussion on LAA cell discovery and RRM measurement mechanisms, Nov. 21, 2014, 3GPP TSG RAN WG1 #79, Tdoc: R1-144742 (Year: 2014).*

(Continued)

*Primary Examiner* — Eric Nowlin
(74) *Attorney, Agent, or Firm* — Arent Fox, LLP

(57) ABSTRACT

Apparatus and methods for transmitting and discovering timing information during wireless communications are described herein. In an aspect, the systems and methods include monitoring at a user equipment (UE) over an unlicensed radio frequency spectrum band for a discovery signal from a network entity; receiving the discovery signal during a subframe from the network entity; and determining a current subframe location of the network entity based on the discovery signal, wherein the discovery signal includes timing information corresponding to the current subframe location.

32 Claims, 13 Drawing Sheets

CSAT DUTY CYCLE = CSAT ON DURATION / CSAT CYCLE DURATION

(51) Int. Cl.
| | | |
|---|---|---|
| *H04W 24/08* | (2009.01) | |
| *H04W 48/08* | (2009.01) | |
| *H04W 48/16* | (2009.01) | |
| *H04W 56/00* | (2009.01) | |
| *H04W 72/04* | (2009.01) | |
| *H04W 74/08* | (2009.01) | |
| *H04W 84/04* | (2009.01) | |
| *H04W 88/02* | (2009.01) | |

(52) U.S. Cl.
CPC .......... *H04W 24/08* (2013.01); *H04W 48/08* (2013.01); *H04W 56/00* (2013.01); *H04W 72/042* (2013.01); *H04L 5/0048* (2013.01); *H04W 74/0808* (2013.01); *H04W 84/045* (2013.01); *H04W 88/02* (2013.01)

(58) Field of Classification Search
CPC ... H04W 72/04; H04W 72/042; H04W 72/12; H04W 72/1215; H04W 74/002; H04W 74/006; H04W 74/0808; H04W 74/0816; H04W 84/045; H04W 88/02; H04L 5/0048; H04L 27/2655; H04B 7/2612
See application file for complete search history.

(56) References Cited

U.S. PATENT DOCUMENTS

| | | | | |
|---|---|---|---|---|
| 9,154,260 | B2* | 10/2015 | Chen | H04L 1/008 |
| 9,432,985 | B2* | 8/2016 | Lee | H04L 5/0037 |
| 9,456,405 | B2* | 9/2016 | Dimou | H04W 48/12 |
| 9,565,568 | B2* | 2/2017 | Suzuki | H04W 16/14 |
| 9,602,322 | B2* | 3/2017 | Luo | H04L 27/2662 |
| 9,622,231 | B2* | 4/2017 | Hong | H04L 5/0053 |
| 9,713,035 | B2* | 7/2017 | Bhushan | H04W 28/0289 |
| 9,713,146 | B2* | 7/2017 | Young | H04W 48/12 |
| 9,756,542 | B2* | 9/2017 | Larsson | H04W 36/26 |
| 9,756,656 | B2* | 9/2017 | You | H04L 1/1864 |
| 9,820,247 | B2* | 11/2017 | Xiong | H04W 4/70 |
| 9,961,657 | B2* | 5/2018 | Xiong | H04W 4/70 |
| 10,148,369 | B2* | 12/2018 | Ng | H04L 5/005 |
| 10,172,077 | B2* | 1/2019 | Luo | H04L 27/2662 |
| 2010/0323684 | A1* | 12/2010 | Cai | H04B 7/2606 455/422.1 |
| 2011/0235584 | A1* | 9/2011 | Chen | H04L 1/008 370/328 |
| 2011/0249633 | A1* | 10/2011 | Hong | H04L 5/0053 370/329 |
| 2013/0094411 | A1* | 4/2013 | Zhang | H04L 5/0048 370/281 |
| 2013/0195073 | A1* | 8/2013 | Chen | H04L 5/0023 370/331 |
| 2013/0294389 | A1* | 11/2013 | Hong | H04L 5/0053 370/329 |
| 2014/0341018 | A1 | 11/2014 | Bhushan et al. | |
| 2014/0341035 | A1* | 11/2014 | Bhushan | H04W 28/0289 370/235 |
| 2014/0362758 | A1* | 12/2014 | Lee | H04L 5/0037 370/312 |
| 2015/0009937 | A1* | 1/2015 | Li | H04L 5/0053 370/329 |
| 2015/0078300 | A1* | 3/2015 | Xu | H04L 5/0053 370/329 |
| 2015/0215910 | A1* | 7/2015 | Han | H04W 56/0045 370/329 |
| 2015/0215911 | A1* | 7/2015 | Dimou | H04W 48/12 370/329 |
| 2015/0223075 | A1* | 8/2015 | Bashar | H04W 16/14 370/329 |
| 2015/0223077 | A1* | 8/2015 | Fan | H04W 16/14 370/312 |
| 2015/0223244 | A1* | 8/2015 | Tabet | H04W 72/12 370/329 |
| 2015/0319701 | A1* | 11/2015 | Ng | H04L 5/005 370/311 |
| 2015/0358945 | A1* | 12/2015 | Susitaival | H04W 48/16 370/329 |
| 2016/0036617 | A1* | 2/2016 | Luo | H04L 27/2662 375/260 |
| 2016/0037514 | A1* | 2/2016 | Xiong | H04W 4/70 370/336 |
| 2016/0057684 | A1* | 2/2016 | Larsson | H04W 36/26 370/331 |
| 2016/0095048 | A1* | 3/2016 | Nory | H04W 24/08 370/252 |
| 2016/0119791 | A1* | 4/2016 | Koskinen | H04W 48/08 455/454 |
| 2016/0128008 | A1* | 5/2016 | Levy | H04W 56/001 370/350 |
| 2016/0143014 | A1* | 5/2016 | Mukherjee | H04W 74/0816 370/330 |
| 2016/0182209 | A1* | 6/2016 | Li | H04L 5/0092 370/329 |
| 2016/0226629 | A1* | 8/2016 | Liu | H04L 1/1861 |
| 2016/0227476 | A1* | 8/2016 | Yerramalli | H04W 24/08 |
| 2016/0249224 | A1* | 8/2016 | Prasad | H04W 16/14 |
| 2016/0309354 | A1* | 10/2016 | Yerramalli | H04W 24/08 |
| 2016/0330678 | A1* | 11/2016 | Yoon | H04L 5/00 |
| 2016/0345306 | A1* | 11/2016 | Lee | H04L 5/0037 |
| 2016/0345338 | A1* | 11/2016 | Kim | H04W 28/08 |
| 2017/0013390 | A1* | 1/2017 | You | H04L 5/0053 |
| 2017/0019838 | A1* | 1/2017 | Harada | H04W 16/14 |
| 2017/0055262 | A1* | 2/2017 | Nakamura | H04W 72/0453 |
| 2017/0164247 | A1* | 6/2017 | Wiemann | H04W 36/0066 |
| 2017/0251372 | A1* | 8/2017 | Belghoul | H04W 16/14 |
| 2017/0295552 | A1* | 10/2017 | Patel | H04W 56/001 |
| 2017/0332359 | A1* | 11/2017 | Tsai | H04B 7/0617 |
| 2017/0353256 | A1* | 12/2017 | Islam | H01Q 3/2605 |
| 2018/0020365 | A1* | 1/2018 | Xiong | H04W 74/0833 |
| 2018/0020462 | A1* | 1/2018 | Xiong | H04W 72/1215 |
| 2018/0097596 | A1* | 4/2018 | Palanivelu | H04L 5/0005 |
| 2018/0192383 | A1* | 7/2018 | Nam | H04W 56/001 |
| 2018/0199310 | A1* | 7/2018 | Islam | H04W 68/025 |
| 2018/0324753 | A1* | 11/2018 | Islam | H04W 48/12 |
| 2019/0082403 | A1* | 3/2019 | Lee | H04W 56/001 |
| 2019/0104503 | A1* | 4/2019 | Niu | H04W 72/042 |
| 2019/0149269 | A1* | 5/2019 | Chatterjee | H04L 1/0693 370/329 |
| 2019/0230698 | A1* | 7/2019 | Al | H04W 72/1289 |

FOREIGN PATENT DOCUMENTS

| | | | | |
|---|---|---|---|---|
| CN | 105530647 A | * | 4/2016 | |
| CN | 105656607 A | * | 6/2016 | |
| EP | 3406041 A1 | * | 11/2018 | ............ H04L 5/005 |
| JP | 2015162894 A | * | 9/2015 | ............ H04W 16/14 |
| JP | WO 2015129875 A1 | * | 9/2015 | ............ H04W 16/14 |
| KR | 20150009937 A | * | 1/2015 | ............ G09C 5/00 |
| KR | 20170019838 A | * | 2/2017 | ............ H01Q 1/243 |
| WO | WO 2013135179 A1 | * | 9/2013 | ............ H04L 5/0053 |
| WO | WO 2014173372 A2 | * | 10/2014 | ............ H04L 5/0092 |
| WO | WO 2015115992 A1 | * | 8/2015 | ............ H04W 48/16 |
| WO | WO-2015/191963 A1 | | 12/2015 | |
| WO | WO-2016/004279 A1 | | 1/2016 | |
| WO | WO-2016/028518 A2 | | 2/2016 | |
| WO | WO 2016050196 A2 | * | 4/2016 | |
| WO | WO 2016074096 A1 | * | 5/2016 | ............ H04W 16/14 |
| WO | WO 2016122110 A1 | * | 8/2016 | ............ H04W 74/00 |
| WO | WO-2017097562 A1 | * | 6/2017 | ............ H04W 48/16 |
| WO | WO 2017100355 A1 | * | 6/2017 | |
| WO | WO-2017127181 A1 | * | 7/2017 | ............ H04L 5/005 |

OTHER PUBLICATIONS

Nokia Networks et al., On UE synchronization in LTE LAA, Nov. 21, 2014, 3GPP TSG-RAN WG1 Meeting #79, Tdoc: R1-145002 (Year: 2014).*

Intel, DRS Design Options for LAA Downlink, Feb. 13, 2015, 3GPP TSG RAN WG1 Meeting #80, Tdoc: R1-150506 (Year: 2015).*

(56) References Cited

OTHER PUBLICATIONS

Panasonic, Discussion on DRS design for LAA, Mar. 26, 2015, 3GPP TSG RAN WG1 Ad-hoc Meeting, Tdoc: R1-151029 (Year: 2015).*
ZTE, Discussion on RRM measurement and DRS design for LAA, Apr. 24, 2015, 3GPP TSG RAN WG1 Meeting #80bis, Tdoc: R1-151806 (Year: 2015).*
Huawei et al., DRS design for LAA, Aug. 28, 2015, 3GPP TSG RAN WG1 82 Meeting, Tdoc: R1-153784 (Year: 2015).*
Qualcomm, DRS design details, DRS design details, Aug. 28, 2015, 3GPP TSG RAN WG1 82 Meeting, Tdoc: R1-153869 (Year: 2015).*
Qualcomm, DRS design details, Discovery and RRM procedure for LAA, Aug. 28, 2015, 3GPP TSG RAN WG1 82 Meeting, Tdoc: R1-153870 (Year: 2015).*
Catt, Design of LAA DRS, Aug. 28, 2015, 3GPP TSG RAN WG1 Meeting #82, Tdoc: R1-153923 (Year: 2015).*
Panasonic, DRS design for LAA, Aug. 28, 2015, 3GPP TSG RAN WG1#82, Tdoc: R1-154018 (Year: 2015).*
ZTE, Details of DRS design for LAA, Aug. 28, 2015, 3GPP TSG RAN WG1 Meeting #82, Tdoc: R1-154075 (Year: 2015).*
Samsung, DRS design and LBT procedure, Aug. 28, 2015, 3GPP TSG RAN WG1 Meeting #82, Tdoc: R1-154143 (Year: 2015).*
Ericsson, On DRS Design and Structure, Aug. 28, 2015, 3GPP TSG RAN WG1 #82, Tdoc: R1-154629 (Year: 2015).*
Mediatek Inc., Enhanced DRS for LAA, Aug. 28, 2015, 3GPP TSG RAN WG1 Meeting #82, Tdoc: R1-154648 (Year: 2015).*
Panasonic, Discussion on LAA Synchronization and Discovery, Nov. 21, 2014, 3GPP TSG-RAN WG1 Meeting 79, Tdoc: R1-144801 (Year: 2014).*
Panasonic, Discussion on LAA subframe boundary alignment, Nov. 21, 2014, 3GPP TSG RAN WG1 Meeting #79, Tdoc: R1-144802 (Year: 2014).*
International Search Report and Written Opinion—PCT/US2016/015761—ISA/EPO—dated Apr. 12, 2016. 16 Total Pages.
Panasonic, et al., "Way Forward on Discovery Signal for LAA," 3GPP Draft; R1-151174, 3rd Generation Partnership Project (3GPP), Mobile Competence Centre; 650, Route Des Lucioles; F-06921 Sophia-Antipolis Cedex; France, vol. RAN WG1, No. Paris, France; Mar. 24, 2015-Mar. 26, 2015, Mar. 26, 2015, XP050951532, Retrieved from the Internet URL: http://www.3gpp.org/ftp/tsg_ran/WG1_RL1/TSGR1_AH/LTE_LAA_1503/Docs/ [retrieved on Mar. 26, 2015] p. 2-p. 5.
Qualcomm Incorporated: "Candidate Solutions for LAA-LTE", 3GPP Draft; R1-145084 Candidate Solutions for LAA-LTE, 3rd Generation Partnership Project (3GPP), Mobile Competence Centre; 658, Route Des Lucioles ; F86921 Sophia-Antipolis Cedex ; France, vol. RAN WG1, No. San Francisco, USA; Nov. 17, 2014-Nov. 21, 2014 Nov. 17, 2014 (Nov. 17, 2014), XP050876118, Retrieved from the Internet: URL: http://www.3gpp.org/ftp/Meetings_3GPP_SYNC/RAN1/Docs/ [retrieved on Nov. 17, 2014] sections 1-3.
Qualcomm Incorporated: "Discovery Procedure, RRM, CQI Measurements and Reporting for LAA," 3GPP Draft; R1-152788—Discovery Procedure, RRM, CQI Measurements and Reporting for LAA, 3rd Generation Partnership Project (3GPP), Mobile Competence Centre; 650, Route Des Lucioles; F-06921 Sophia, vol. RAN WG1, No. Fukuoka, Japan; May 25, 2015-May 29, 2015, May 16, 2015, XP050971160, Retrieved from the Internet URL: http://www.3gpp.org/ftp/tsg_ran/WG1_RL1/TSGR1_81/Docs/ , [retrieved on May 16, 2015] section 2.2.

* cited by examiner

TIMING INFORMATION FOR DISCOVERY IN UNLICENSED SPECTRUM

CLAIM OF PRIORITY UNDER 35 U.SC. § 119

The present application for patent claims priority to U.S. Provisional Application No. 62/109,504 entitled "TIMING INFORMATION FOR DISCOVERY IN UNLICENSED SPECTRUM" filed Jan. 29, 2015, which is assigned to the assignee hereof and hereby expressly incorporated by reference herein.

BACKGROUND

Aspects of this disclosure relate generally to telecommunications, and more particularly to techniques for transmitting and receiving synchronization signals over an unlicensed radio frequency spectrum band.

A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectively for communicating with one another.

Communication between devices in a wireless communication network may be subject to interference. For a communication from a first network device to a second network device, emissions of radio frequency (RF) energy by a nearby device may interfere with reception of signals at the second network device. For example, a Long Term Evolution (LTE) device operating in an unlicensed RF band that is also being used by a Wi-Fi device may experience significant interference from the Wi-Fi device, and/or can cause significant interference to the Wi-Fi device.

Some modes of communication may enable communications between a base station and a user equipment (UE) over an unlicensed radio frequency spectrum band, or over different radio frequency spectrum bands (e.g., a licensed radio frequency spectrum band and/or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

In some wireless networks, certain transmission procedures may not be permitted over an unlicensed frequency spectrum band. As such, a UE may be unable to properly receive and determine synchronization information for a network entity and/or cell. As a result, the UE may be unable to properly connect to the network entity and/or cell. Thus, improvements in discovery and synchronization procedures may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a present method relates to discovering timing information during wireless communications. The described aspects include monitoring at a user equipment (UE) over an unlicensed radio frequency spectrum band for a discovery signal from a network entity. The described aspects further include receiving the discovery signal during a subframe from the network entity. The described aspects further include determining a current subframe location of the network entity based on the discovery signal, wherein the discovery signal includes timing information corresponding to the current subframe location.

In another aspect, a present computer-readable medium storing computer executable code relates to discovering timing information during wireless communications. The described aspects further include code for monitoring at a UE over an unlicensed radio frequency spectrum band for a discovery signal from a network entity. The described aspects further include code for receiving the discovery signal during a subframe from the network entity. The described aspects further include code for determining a current subframe location of the network entity based on the discovery signal, wherein the discovery signal includes timing information corresponding to the current subframe location.

In further aspects, a present apparatus relates to discovering timing information during wireless communications. The described aspects include means for monitoring at a UE over an unlicensed radio frequency spectrum band for a discovery signal from a network entity. The described aspects further include means for receiving the discovery signal during a subframe from the network entity. The described aspects further include means for determining a current subframe location of the network entity based on the discovery signal, wherein the discovery signal includes timing information corresponding to the current subframe location.

In an additional aspect, a present apparatus relates to discovering timing information during wireless communications. The described aspects include a memory configured to store data, and one or more processors communicatively coupled with the memory, wherein the one or more processors and the memory are configured to monitor at a UE over an unlicensed radio frequency spectrum band for a discovery signal from a network entity. The described aspects further receive the discovery signal during a subframe from the network entity. The described aspects further determine a current subframe location of the network entity based on the discovery signal, wherein the discovery signal includes timing information corresponding to the current subframe location.

In another aspect, a present method relates to transmitting timing information during wireless communications. The described aspects include establishing at a network entity the timing information for a discovery signal, wherein the timing information corresponds to a current subframe location of the network entity. The described aspects further include transmitting the discovery signal during a subframe over an unlicensed radio frequency spectrum band to a UE.

In a further aspects, a present computer-readable medium storing computer executable code relates to transmitting timing information during wireless communications. The described aspects include code for establishing at a network entity the timing information for a discovery signal, wherein the timing information corresponds to a current subframe location of the network entity. The described aspects further include code for transmitting the discovery signal during a subframe over an unlicensed radio frequency spectrum band to a UE.

In another aspect, a present apparatus relates to transmitting timing information during wireless communications. The described aspects include means for establishing at a network entity the timing information for a discovery signal, wherein the timing information corresponds to a current subframe location of the network entity. The described aspects further include means for transmitting the discovery signal during a subframe over an unlicensed radio frequency spectrum band to a UE.

In an additional aspect, a present apparatus relates to transmitting timing information during wireless communications. The described aspects include a memory configured to store data, and one or more processors communicatively coupled with the memory, wherein the one or more processors and the memory are configured to establish at a network entity the timing information for a discovery signal, wherein the timing information corresponds to a current subframe location of the network entity. The described aspects further include transmit the discovery signal during a subframe over an unlicensed radio frequency spectrum band to a UE.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components. If the first reference label is used in the specification, the description is applicable to any one of the similar components having the same first reference label irrespective of the second reference label.

DETAILED DESCRIPTION

Figure 1:
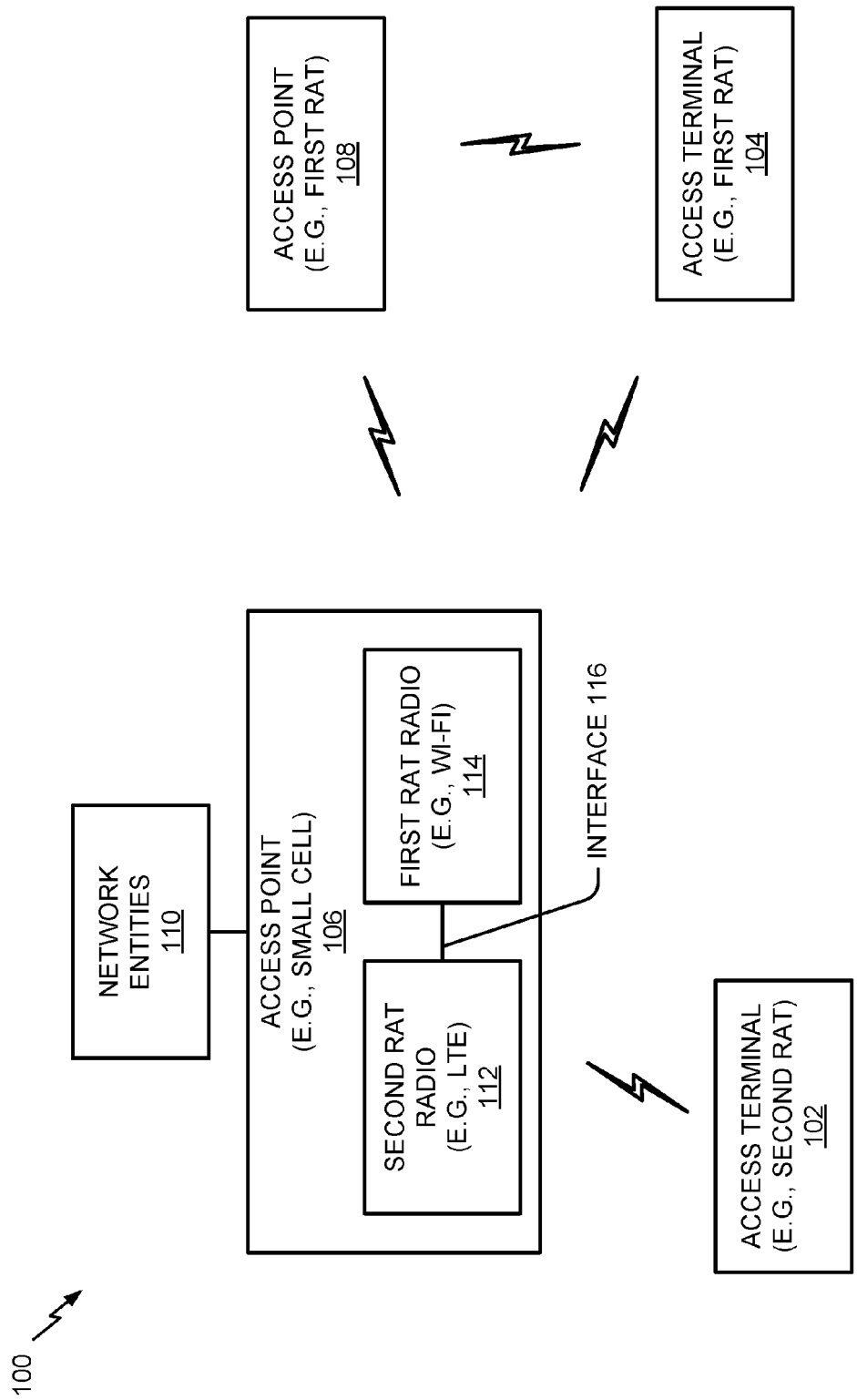
FIG. 1 is a block diagram illustrating an example of several aspects of a communication system employing co-located radios.

The present aspects generally relate to transmitting and discovery timing information during wireless communication. For example, prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. The CCA procedure is composed of two related functions, carrier sense (CS) and energy detection (ED). Carrier sense refers the ability of the receiver to detect and decode an incoming Wi-Fi signal preamble. Energy detection (ED) refers to the ability of the receiver to detect the non-Wi-Fi energy level present on the current channel (frequency range) based on the noise floor, ambient energy, interference sources, and unidentifiable Wi-Fi transmissions that may have been corrupted and can no longer be decoded. Unlike carrier sense, which can determine the exact length of time the medium will be busy with the current frame, energy detection must sample the medium every slot time to determine if the energy still exists. When it is determined that the channel of the unlicensed radio frequency spectrum band is not available (e.g., because another apparatus is already using the channel of the unlicensed radio frequency spectrum band), a CCA procedure may be performed for the channel again at a later time.

Before a UE may communicate with a base station, the UE may need to discover or acquire the base station (or a cell). After a UE discovers the base station or cell, the UE may need to periodically synchronize with the base station or cell in order to properly communicate with, and decode communications from, the base station. In some examples, a base station may transmit a synchronization signal, and a UE may receive and decode the synchronization signal to discover and/or synchronize with the base station (or with a cell). Most transmissions onto the unlicensed carriers in networks with unlicensed spectrum are made by transmitters after first complying with the LBT protocols. However, certain transmissions are made without first checking for a clear channel. CCA-exempt transmissions (CET) occur in both downlink and uplink communications. In an aspect, the network may prohibit CETs and/or the discovery signal transmitted in CETs may not be decodable due to interference. As a result, the timing information may not be known to the UE, and so, the UE may not be able to properly connect with the network.

Accordingly, in some aspects, the present methods and apparatuses may provide an efficient solution, as compared to current solutions, by transmitting and discovering timing information during wireless communication over an unlicensed frequency spectrum band. In the instances where the network may prohibit CETs and/or the discovery signal transmitted in CETs may not be decodable due to interference, the present methods and apparatus provide that timing information may be transmitted as part of the discovery signal instead of the CETs. As such, the timing information allows the UE to determine the current subframe location in which the discovery signal is present, which in turn, causes the UE to determine the discovery window, discovery period, and radio frame boundary.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 illustrates several nodes of a sample communication system 100 (e.g., a portion of a communication network) where an access terminal may include a subframe component 420 (FIG. 4), and where an access point may include a corresponding subframe component 460 (FIG. 4), wherein the respective subframe components operate to enable the access terminal to discover and/or synchronize with the access point when the access terminal is operating in a standalone mode in an unlicensed radio frequency spectrum band. The details of the operation of subframe component 420 and subframe component 460 are described below with respect to FIGS. 4-8. For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points, which may correspond to network entity 404 including subframe component 420 (FIG. 4), in the system 100 provide access to one or more services (e.g., network connectivity) for one or more wireless terminals (e.g., the access terminal 102 or the access terminal 104) that may be installed within or that may roam throughout a coverage area of the system 100. For example, at various points in time the access terminal 102 may connect to the access point 106 or some other access point in the system 100 (not shown). Similarly, the access terminal 104 may connect to the access point 108 or some other access point.

One or more of the access points may communicate with one or more network entities (represented, for convenience, by the network entities 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations the network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

When the access point 106 (or any other devices in the system 100) uses a first RAT to communicate on a given resource, this communication may be subjected to interference from nearby devices (e.g., the access point 108 and/or the access terminal 104) that use a second RAT to communicate on that resource. For example, communication by the access point 106 via LTE on a particular unlicensed RF band may be subject to interference from Wi-Fi devices operating on that band. For convenience, LTE on an unlicensed RF band may be referred to herein as LTE/LTE Advanced in unlicensed spectrum, or simply LTE in the surrounding context. Moreover, a network or device that provides, adapts, or extends LTE/LTE Advanced in unlicensed spectrum may refer to a network or device that is configured to operate in a contention-based radio frequency band or spectrum.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding UE (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink.

OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
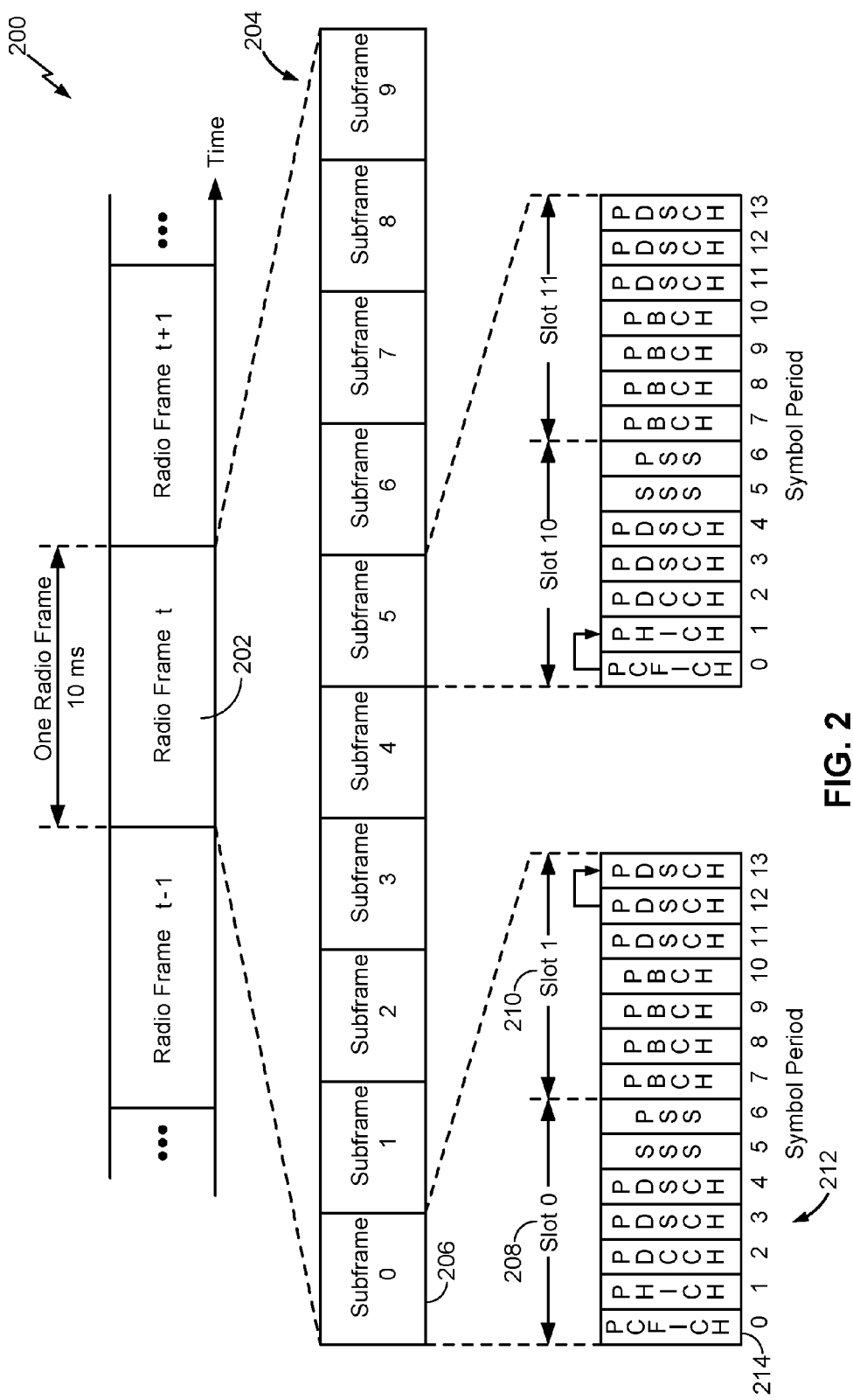
FIG. 2 shows a downlink frame structure used in LTE.
Figure 4:
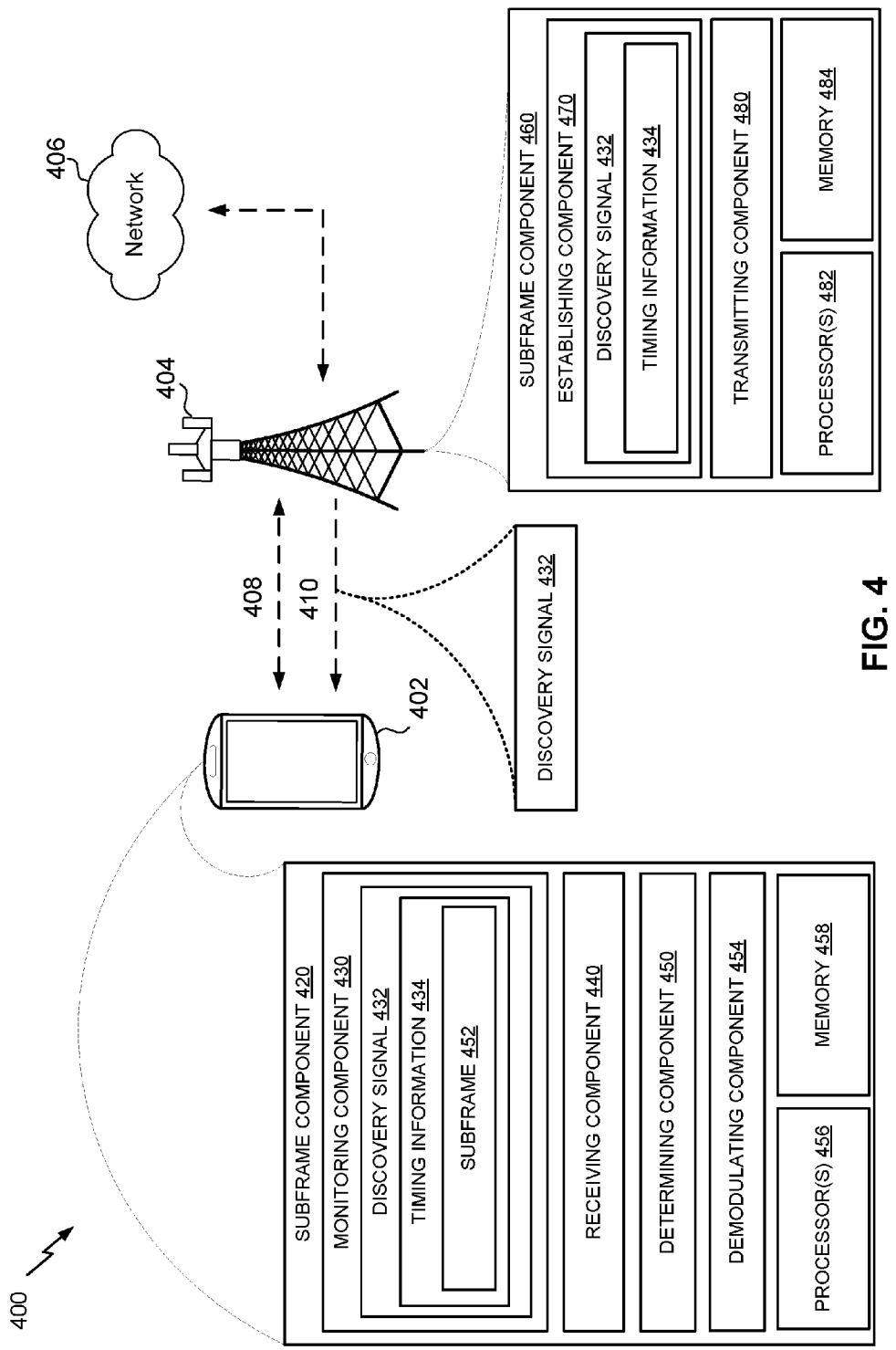
FIG. 4 is schematic diagram illustrating an example of a communication network including an aspect of transmitting and discovering timing information during wireless communication.
Figure 6:
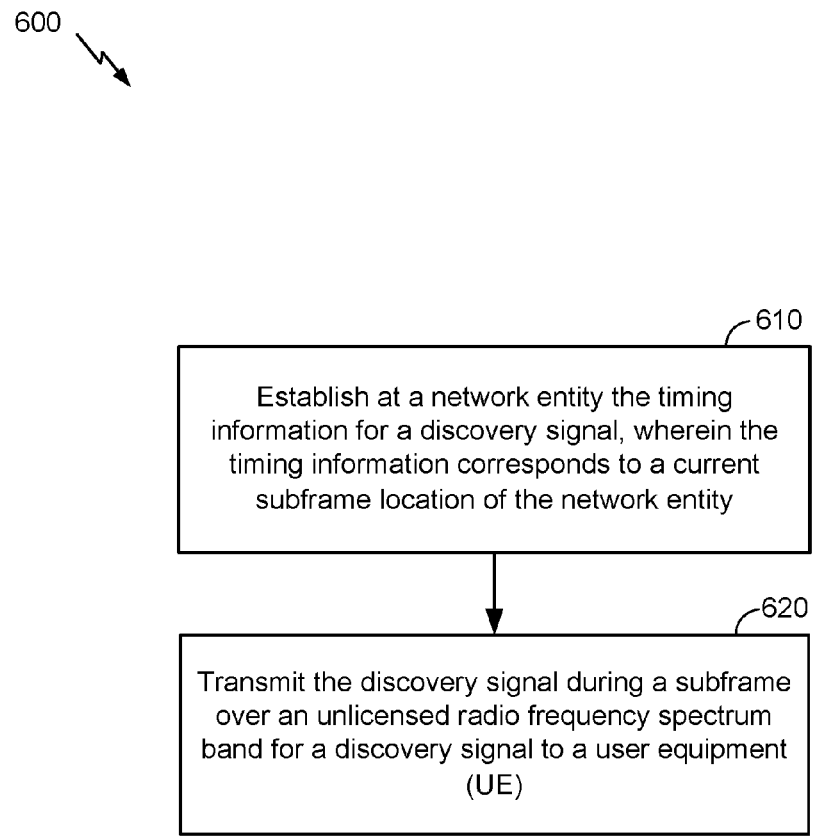
FIG. 6 is a flow diagram illustrating another example method of transmitting timing information during wireless communication.

FIG. 2 shows a downlink frame structure 200 used in LTE, which may be used in sending communications from subframe component 460 (FIG. 4) to subframe component 420 (FIG. 4). The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, the access point (referred to as an eNB), which may correspond to network entity 404 including subframe component 420 (FIG. 4), may send a Primary Synchronization Signal (PSS) and a Secondary Synchronization Signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by the access terminals (referred to as UEs) for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH may also be included in the first symbol period. Similarly, the PHICH and PDCCH may also both be in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search. A UE may be within the coverage of multiple eNBs. One of these eNBs may be selected to serve the UE. The serving eNB may be selected based on various criteria such as received power, path loss, signal-to-noise ratio (SNR), etc.

Returning to FIG. 1, the disclosure relates in some aspects to techniques referred to herein as carrier sense adaptive transmission (CSAT), which may be used to facilitate coexistence between different technologies operating on a commonly used resource (e.g., a particular unlicensed RF band or co-channel). The access point 106 includes co-located radios (e.g., transceivers) 112 and 114. The radio 112 uses a second RAT (e.g., LTE) to communicate. The radio 114 is capable of receiving signals using a first RAT (e.g., Wi-Fi). In addition, an interface 116 enables the radios 112 and 114 to communicate with one another.

These co-located radios are leveraged to enable a carrier sense multiple access-like (CSMA-like) mode of operation whereby the radio 114 repeatedly (e.g., periodically) conducts measurements on the co-channel. Based on these measurements, the radio 112 determines the extent to which the co-channel is being utilized by devices operating on the first RAT. The radio 112 is thus able to adapt its communication on the channel (using the second RAT) according to the resource utilization.

For example, if the utilization of the resource by Wi-Fi devices is high, an LTE radio may adjust one or more transmission parameters that the LTE radio uses to communicate via the co-channel such that usage of the co-channel by the LTE radio is reduced. For example, the LTE radio may reduce its transmit duty cycle, transmit power, or frequency allocation.

Conversely, if the utilization of the resource by Wi-Fi devices is low, an LTE radio may adjust one or more transmission parameters that the LTE radio uses to communicate via the co-channel such that usage of the co-channel by the LTE radio is increased. For example, the LTE radio may increase its transmit duty cycle, transmit power, or frequency allocation.

The disclosed scheme may provide several advantages. For example, by adapting communication based on signals associated with the first RAT, the second RAT may be configured to only react to utilization of the co-channel by devices that use the first RAT. Thus, interference by other devices (e.g., non-Wi-Fi devices) or adjacent channel interference may be ignored, if desired. As another example, the scheme enables a device that uses a given RAT to control how much protection is to be afforded to co-channel communications by devices that use another RAT. Also, such a scheme may be implemented in an LTE system without changing the LTE PHY or MAC. For example, these changes may be implemented by simply changing LTE software.

In some aspects, the advantages discussed herein may be achieved by adding a Wi-Fi chip or similar functionality to an LTE access point. If desired, a low functionality Wi-Fi circuit may be employed to reduce costs (e.g., the Wi-Fi circuit simply providing low-level sniffing).

As used herein, the term co-located (e.g., radios, access points, transceivers, etc.) may include in various aspects, one or more of, for example: components that are in the same housing; components that are hosted by the same processor; components that are within a defined distance of one another, or components that are connected via an interface (e.g., an Ethernet switch) where the interface meets the latency requirements of any required inter-component communication (e.g., messaging).

Although aspects of the disclosure are described with respect to carrier sense adaptive transmission, the disclosure need not be so limited. The same and/or different aspects or techniques described herein may, in some instances, be implemented using other mechanisms configured to facilitate co-existence between different technologies operating on a commonly used resource (e.g., unlicensed spectrum).

Figure 3:
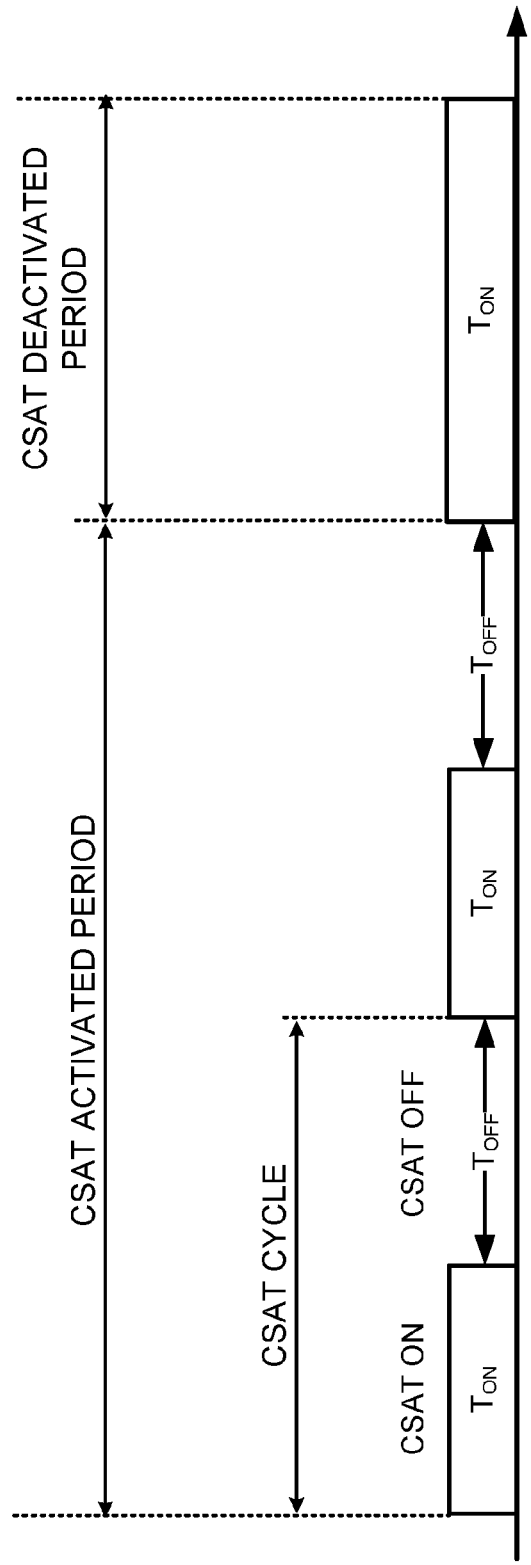
FIG. 3 is a diagram illustrating an example of carrier sense adaptive transmission (CSAT) time division multiplexing (TDM) duty cycling.

FIG. 3 illustrates an example of CSAT Time Division Multiplexed (TDM) duty cycling for LTE in unlicensed spectrum communicated by an access terminal, where an access terminal may include a subframe component 420 (FIG. 4), and where an access point may include a corresponding subframe component 460 (FIG. 4), wherein the respective subframe components operate to enable the access terminal to discover and/or synchronize with the access point when the access terminal is operating in a standalone mode in an unlicensed radio frequency spectrum band. The details of the operation of subframe component 420 and subframe component 460 are described below with respect to FIGS. 4-8. During time $T_{ON}$, transmission on the unlicensed RF band is enabled, which may be referred to as a CSAT ON period. During time $T_{OFF}$, transmission on the unlicensed RF band is disabled, which may be referred to as a CSAT OFF period, to enable a co-located Wi-Fi radio to conduct measurements. In this way, TDM communication duty cycling for LTE in unlicensed spectrum may be implemented to create adaptable TDM transmission patterns.

FIG. 4 is a diagram illustrating an example of a telecommunications network system 400 in accordance with an aspect of the present disclosure, including at least one UE 402 in communication coverage of at least one network entity 404 (e.g., base state or node B). UE 402 can communicate with network 406 via network entity 404. In an aspect, UE 402 may include one or more processors 456, and optionally, memory 458, that may operate in combination with subframe component 420 to discover timing information during wireless communication. Similarly, network entity 404 may include one or more processors 482, and optionally, memory 484, that may operate in combination with subframe component 460 to transmit timing information during wireless communications. In other words, the respective subframe components operate to enable a UE or access terminal to discover and/or synchronize with an eNodeB or access point when the UE or access terminal is operating in a standalone mode and/or carrier aggregation mode in an unlicensed frequency spectrum. Accordingly, the present aspects may enable the UE 402 to discover timing information in situations in which the network may prohibit CETs and/or the discovery signal transmitted in CETs may not be decodable due to interference.

In an aspect, the network entity 404 may be a base station such a NodeB in an UMTS network. UE 402 may communicate with a network 406 via network entity 404. In some aspects, multiple UEs including UE 402 may be in communication coverage with one or more network entities, including network entity 404. In an example, UE 402 may transmit and/or receive wireless communications 408/410 to and/or from network entity 404. In some aspects, UE 402 may communicate with network entity 404 across the licensed and/or unlicensed spectrum using communication channel 408 (e.g., both uplink and downlink) and downlink communication channel 410.

In an aspect, each network entity 404 may include subframe component 460, which may be configured to transmit one or more discovery signals 432 including timing information 434 over an unlicensed radio frequency spectrum to a UE, such as UE 402, which may be configured with subframe component 420 to monitor for the one or more discovery signals 432. For example, in an aspect, discovery signal 432 may include, but is not limited to, a transmitted signal on a physical channel configured to provide information to the UE 402 to connect with network entity 404. Further, for example, in an aspect, timing information may include, but is not limited to, one or more bits indicating a current subframe location in relation to the radio frame. In some instances, the unlicensed frequency band may be considered to be any portion of the radio spectrum (e.g., a portion of a shared channel in the radio spectrum) whose use is not restricted through a spectrum licensing approach. In some instances, the network 406 may be allowed to operate with clear channel assessment (CCA) exempt transmissions (CETs) and/or the discovery signal 432 transmitted in CET occasions may not be decodable due to interference. In an aspect, the CCA procedure determines whether a channel of the unlicensed radio frequency spectrum band is available. In previous instances, where CETs are unable to be transmitted and/or received, the timing information for the network entity 404 may be difficult to obtain or otherwise determine. As such, subframe component 460 of network entity 404 may transmit the discovery signal 432 via downlink communication channel 410 to UE 402 without the need for a CET because the discovery signal 432 includes timing information 434 corresponding to the current subframe location of the network entity 404. For example, in an aspect, the subframe component 460 may transmit downlink control information (DCI) on a physical downlink control channel (PDCCH) and/or an enhanced PDCCH (ePDCCH) including the timing information 434.

In an aspect, subframe component 420 of UE 402 may include monitoring component 430, which may be configured to monitor over an unlicensed radio frequency spectrum band for a discovery signal 432 from network entity 404. Further, subframe component 420 of UE 402 may include receiving component 440, which may be configured to receive the discovery signal 432 during a subframe 452 from the network entity 404. Moreover, subframe component 420 of UE 402 may include determining component 450, which may be configured to determine a current subframe location (corresponding to subframe 452) of the network entity 404 based on the discovery signal 432, wherein the discovery signal 432 includes timing information 434 corresponding to the current subframe location. As a result of determining the current subframe location, UE 402 may determine the timing information corresponding to the radio frame boundary of the network entity 404 and synchronize with the network entity 404. Subframe component 420 may be further configured to include demodulating component 454, which may be configured to demodulate the ePDCCH based on synchronization information included in the discovery signal 432.

In another aspect, subframe component 460 of network entity 404 may include establishing component 470, which may be configured to establish the timing information 434 for inclusion in a discovery signal 432. In some instances, the timing information 434 corresponds to a current subframe location of network entity 404. Further, subframe component 460 of network entity 404 may include transmitting component 480, which may be configured to transmit the discovery signal 432 during a subframe 452 over an unlicensed radio frequency spectrum band to a UE 402. As such, the network entity 404 may transmit the discovery signal 432 without the need for CETs.

Moreover, for example, the telecommunications network system 400 may be an LTE network. The telecommunications network system 400 may include a number of evolved NodeBs (eNodeBs) (e.g., network entity 404) and UEs 402 and other network entities. An eNodeB may be a station that communicates with the UEs 402 and may also be referred to as a base station, an access point, etc. A NodeB is another example of a station that communicates with the UEs 402.

Each eNodeB (e.g., network entity 404) may provide communication coverage for a particular geographic area. In 3GPP, the term "cell" can refer to a coverage area of an eNodeB and/or an eNodeB subsystem serving the coverage area, depending on the context in which the term is used.

An eNodeB (e.g., network entity 404) may provide communication coverage for a small cell and/or other types of cell. The term "small cell" (or "small coverage cell"), as used herein, may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. An eNodeB for a macro cell may be referred to as a macro eNodeB. An eNodeB for a pico cell may be referred to as a pico eNodeB. An eNodeB for a femto cell may be referred to as a femto eNodeB or a home eNodeB.

In some aspects, UE 402 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 402 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc), an appliance, a sensor, a vehicle communication system, a medical device, a vending machine, a device for the Internet-of-Things, or any other similar functioning device. Additionally, network entity 404 may be a macrocell, picocell, femtocell, relay, Node B, mobile Node B, UE (e.g., communicating in peer-to-peer or ad-hoc mode with UE 402), or substantially any type of component that can communicate with UE 402 to provide wireless network access at the UE 402.

Figure 5A:
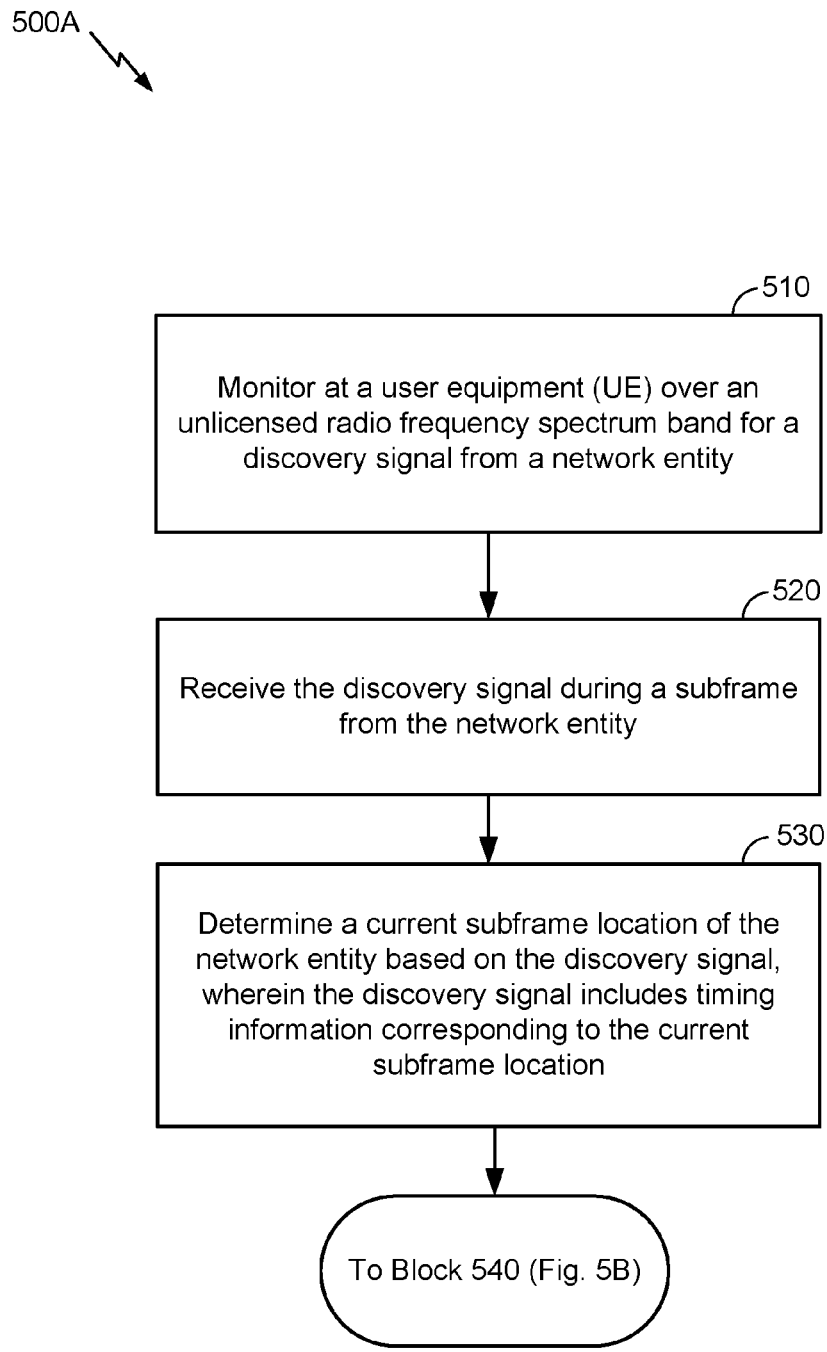
FIGS. 5A and 5B are flow diagrams illustrating an example method of discovering timing information during wireless communication.

Referring to FIG. 5, in operation, a UE such as UE 402 (FIG. 4) may perform an aspect of method 500A for discovering timing information during wireless communication. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 510, method 500A includes monitoring at a UE over an unlicensed radio frequency spectrum band for a discovery signal from a network entity. For example, as described herein, subframe component 420 may include monitoring component 430 (FIG. 4) to monitor at a UE (e.g., UE 402) over an unlicensed radio frequency spectrum band for a discovery signal 432 from a network entity 404. In some instances, the discovery signal 432 includes an enhanced system information block (eSIB), wherein the eSIB includes SIB1, SIB2, and master information block (MIB) which are parameters that allow the UE 402 to connect to the network entity 404. In certain instances, the discovery signal 432 includes synchronization information corresponding to a primary synchronization signal (PSS) and a secondary synchronization signal (SSS).

At block 520, method 500A includes receiving the discovery signal during a subframe from the network entity. For example, as described herein, subframe component 420 may include receiving component 440 (FIG. 4) to receive the discovery signal during a subframe from the network entity. In some instances, the discovery signal 432 is received on a physical downlink control channel (PDCCH) and/or an enhanced PDCCH (ePDCCH) (e.g., downlink communication channel 410 of FIG. 4) from the network entity 404 during a CCA procedure to establish whether a channel of the unlicensed radio frequency spectrum band is available.

Further, at block 530, method 500A includes determining a current subframe location of the network entity based on the discovery signal, wherein the discovery signal includes timing information corresponding to the current subframe location. For example, as described herein, subframe component 420 may include determining component 450 (FIG. 4) to determine a current subframe location of the network entity based on the discovery signal, wherein the discovery signal includes timing information corresponding to the current subframe location. In some aspects, method 500A may proceed to block 540 of FIG. 5B.

Figure 5B:
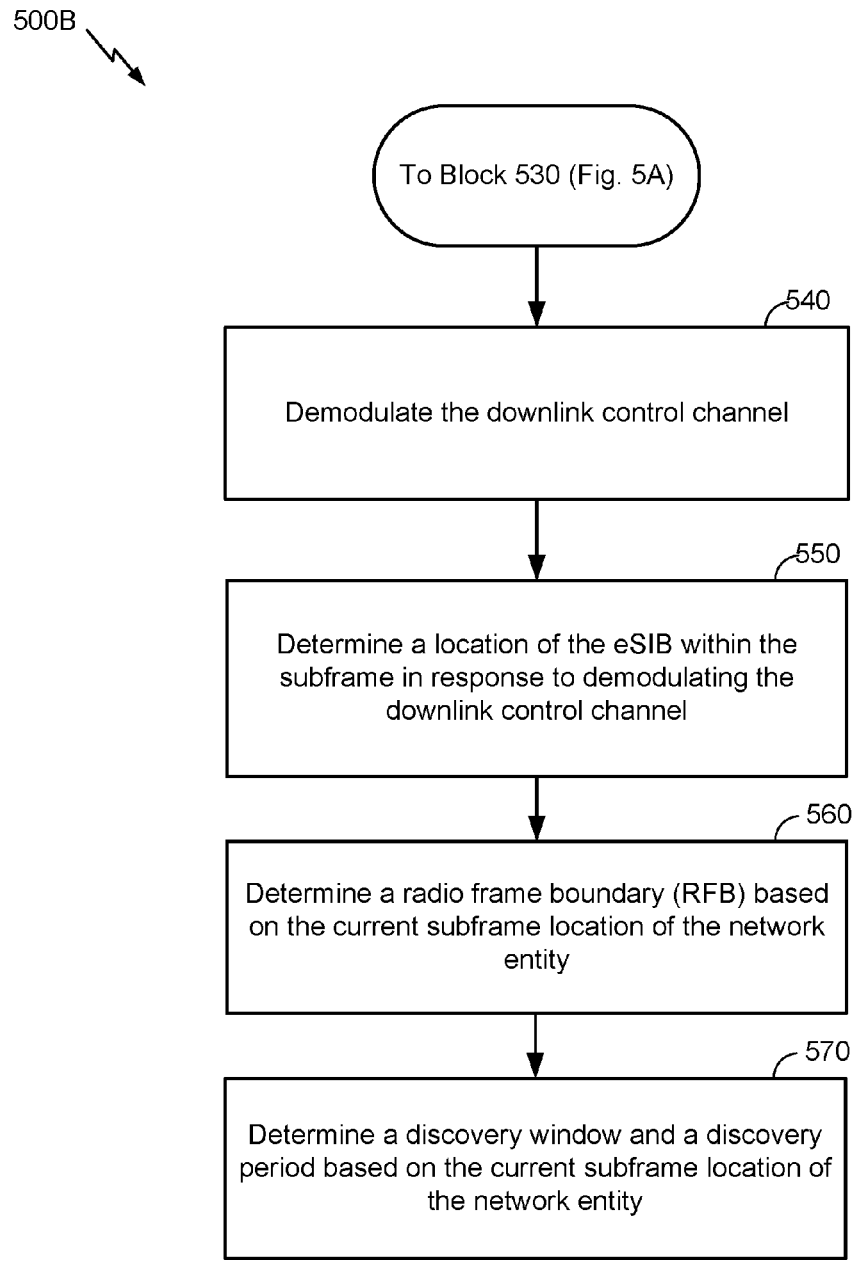

Referring to FIG. 5B, in an aspect, at block 540, method 500B includes demodulating the downlink control channel. For example, as described herein, subframe component 420 may include demodulating component 454 (FIG. 4) to demodulate the downlink control channel. In some aspects, the downlink control channel may correspond to either a PDCCH or an ePDCCH. In some instances, subframe component 420 and/or demodulating component 454 may be configured to demodulate the ePDCCH based on synchronization information included in the discovery signal 432. The subframe component 420 may demodulate the ePDCCH without a cell-specific reference signal (CRS).

In an aspect, at block 550, method 500B includes determining a location of the eSIB within the subframe in response to demodulating the downlink control channel. For example, as described herein, subframe component 420 may include determining component 450 (FIG. 4) to determine a location of the eSIB within the subframe 452 in response to demodulating the ePDCCH.

In an aspect, at block 560, method 500B includes determining a radio frame boundary (RFB) based on the current subframe location of the network entity. For example, as described herein, subframe component 420 may include determining component 450 (FIG. 4) to determine a RFB based on the current subframe location of the network entity 404.

In an aspect, at block 570, method 500B includes determining a discovery window and a discovery period based on the current subframe location of the network entity. For example, as described herein, subframe component 420 may include determining component 450 (FIG. 4) to determine a discovery window and a discovery period based on the current subframe location of the network entity 404. In some instances, a size of the discovery window and a size of the discovery period are preconfigured. In other instances, a time indication may be received by subframe component 420 corresponding to the timing information for the discovery window. The discovery signal 432 may be received as a non-periodic opportunistic signal during the discovery window.

Referring to FIG. 6, in operation, a network entity such as network entity 404 (FIG. 4) may perform an aspect of method 600 for transmitting timing information during wireless communication. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 610, method 600 includes establishing at a network entity the timing information for a discovery signal, wherein the timing information corresponds to a current subframe location of the network entity. For example, as described herein, subframe component 460 may include establishing component 470 (FIG. 4) to establish at a network entity the timing information for a discovery signal, wherein the timing information corresponds to a current subframe location of the network entity. In some instances, the discovery signal 432 includes an enhanced system information block (eSIB), wherein the eSIB includes, at least one or more of SIB1, SIB2, and master information block (MIB), which are parameters used by the UE 402 to connect to the network entity 404.

Moreover, the subframe component 460 establishes the timing information 434 for the discovery signal 432 by determining a number of discovery windows present during each discovery period; and calculating a number of bits to include in the discovery signal 432 based on the determination of the number of discovery windows present during each discovery period. In certain instances, calculating the number of bits included in the discovery signal 432 further comprises calculating the number of bits based on a size of the discovery window when one discovery window is present during each discovery period. In other instances, calculating the number of bits included in the discovery signal 432 further comprises calculating the number of bits based on a size of the discovery period when more than one discovery window is present during each discovery period.

Further, at block 620, method 600 includes transmitting the discovery signal during a subframe over an unlicensed radio frequency spectrum band to a user equipment (UE). For example, as described herein, subframe component 460 may include transmitting component 480 (FIG. 4) to transmit the discovery signal during a subframe over an unlicensed radio frequency spectrum band to a user equipment (UE). In some instances, the discovery signal 432 is transmitted on an enhanced physical downlink control channel (ePDCCH) to the UE 402 during a clear channel assessment (CCA) procedure to establish whether a channel of the unlicensed radio frequency spectrum band is available. As such, the discovery signal 432 includes synchronization information used to demodulate the ePDCCH and wherein a location of the eSIB within the subframe is determined in response to demodulating the ePDCCH. The synchronization information may include a primary synchronization signal (PSS) and a secondary synchronization signal (SSS).

Moreover, in some instances, for example, the discovery signal may be transmitted without a cell-specific reference signal (CRS). The discovery signal may also be transmitted by the subframe component 460 as a non-periodic opportunistic signal during a discovery window.

Figure 7:
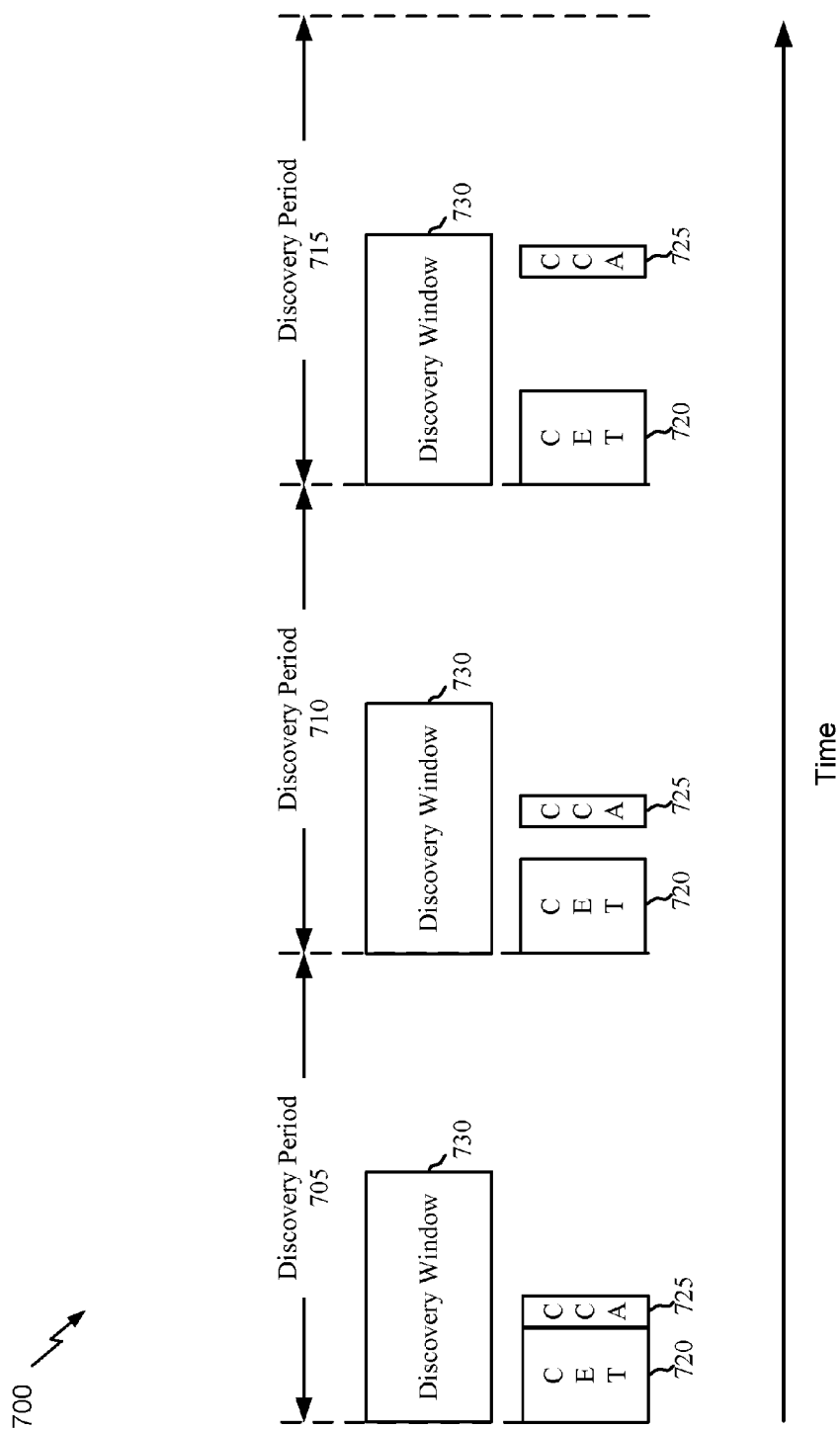
FIG. 7 is a conceptual diagram illustrating an example of the discovery procedure between the UE and the network entity.

FIG. 7 shows an example 700 of transmissions made by a network entity over an unlicensed radio frequency spectrum band, in accordance with various aspects of the present disclosure. In some examples, the network entity making the transmissions may be an example of aspects of the network entity 404 described with reference to FIG. 4.

By way of example, FIG. 7 illustrates transmissions over time made by a network entity over time, in three adjacent discovery periods. The three adjacent discovery periods include a first discovery period 705, a second discovery period 710, and a third discovery period 715.

The transmissions made by the network entity may include synchronous transmissions made during downlink CETs (CETs 720) of the network entity, synchronous transmissions made during non-periodic subframe locations (e.g., following successful CCAs 725), and asynchronous transmissions made during a discovery window 730.

The discovery window 730 may be provided in each of the first discovery period 705, the second discovery period 710, and the third discovery period 715; once every N discovery periods (where N>1); or in one or more discovery periods on a dynamic basis. The length or duration of the discovery window 730 may be shorter or longer than shown. In some examples, the discovery window 730 may overlap in time with at least one non-periodic subframe location (e.g., at least one subframe following a CCA 725). In some examples, the discovery window 730 may be associated with a different set of subcarrier frequencies of the unlicensed radio frequency spectrum band than the set of subcarrier frequencies included in a CET 720, a CCA 725, or a periodic fixed subframe following a CCA 725.

In some aspects, a synchronization signal may be transmitted by the network entity during one or more of the CETs 720, during one or more periodic fixed subframe locations (e.g., following one or more successful CETs 720), and/or during the discovery window 730. A transmission of a synchronization signal during a CET 720 or during a periodic fixed subframe may be considered a synchronous transmission, whereas a transmission of a synchronization signal during the discovery window 730 may be considered an asynchronous transmission. In some examples, a transmitted synchronization signal may be used for cell discovery, synchronization, and/or other purposes. In some examples, a transmitted synchronization signal may include a PSS, and/or an SSS.

In some aspects, the network entity may attempt to transmit an opportunistic discovery signal (e.g., one or more CCA 725) during the discovery window 730. In certain instances, the network may be prevented from transmitting CETs 720 and/or the discovery signal transmitted in CET 720 may not be decodable due to interference. As such, the network entity may transmit one or more CCAs 725, outside of a time period for transmitting the CET 720, during the discovery window 730, where the one or more CCAs 725 may be discovery signals, such as discovery signal 432 of FIG. 4. The CCAs 725 may include timing information that the UE may use in order to determine the location of the current subframe in which the discovery signal was transmitted. Based on the timing information, the UE may be able to determine boundaries of the discovery window 730, and/or boundaries of a discovery period 705 or 710 or 715, and/or boundaries of a radio frame, and as such, synchronize with the network entity and/or cell. Therefore, receiving the CETs 720 are no longer necessary for the UE to be able to properly synchronize with the network entity.

Figure 8:
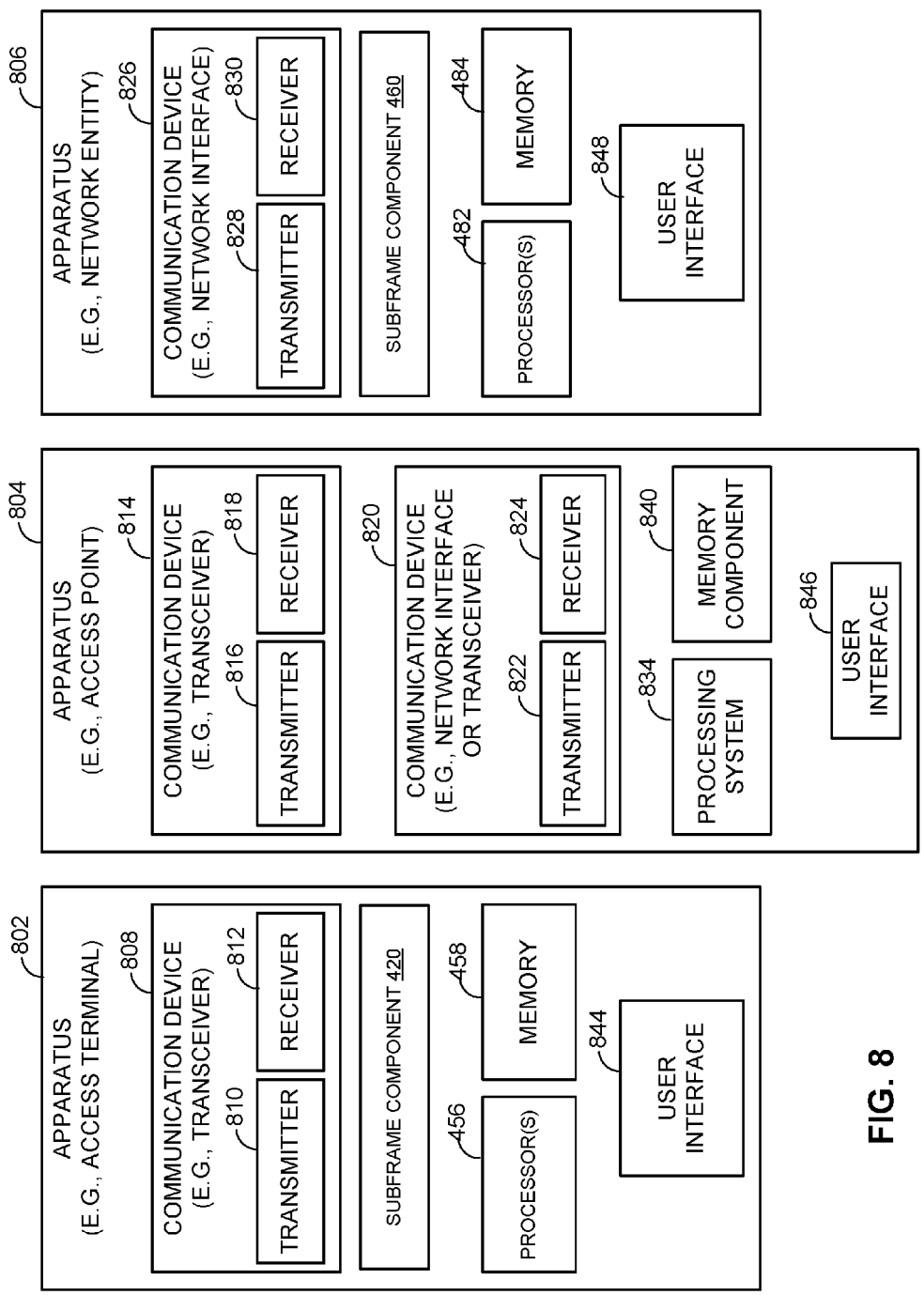
FIG. 8 is a simplified block diagram of several sample aspects of components that may be employed in communication nodes.

FIG. 8 illustrates several sample components (represented by corresponding blocks) that may be incorporated into an apparatus 802 (e.g., an access terminal), which may correspond to UE 402 (FIG. 4), which may correspond to UE 402 including subframe component 420 (FIG. 4), and an apparatus 804 and an apparatus 806 (e.g., an access point and a network entity, respectively), where one or both of which may correspond to network entity 404 including subframe component 460 (FIG. 4), to support operations as taught herein. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 802 and the apparatus 804 each include at least one wireless communication device (represented by the communication devices 808 and 814 (and the communication device 820 if the apparatus 804 is a relay)) for communicating with other nodes via at least one designated radio access technology. Each communication device 808 includes at least one transmitter (represented by the transmitter 810) for transmitting and encoding signals (e.g., messages, indications, information, and so on) and at least one receiver (represented by the receiver 812) for receiving and decoding signals (e.g., messages, indications, information, pilots, and so on). Similarly, each communication device 814 includes at least one transmitter (represented by the transmitter 816) for transmitting signals (e.g., messages, indications, information, pilots, and so on) and at least one receiver (represented by the receiver 818) for receiving signals (e.g., messages, indications, information, and so on). If the apparatus 804 is a relay access point, each communication device 820 may include at least one transmitter (represented by the transmitter 822) for transmitting signals (e.g., messages, indications, information, pilots, and so on) and at least one receiver (represented by the receiver 824) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 804 comprises a network listen module.

The apparatus 806 (and the apparatus 804 if it is not a relay access point) includes at least one communication device (represented by the communication device 826 and, optionally, 820) for communicating with other nodes. For example, the communication device 826 may comprise a network interface that is configured to communicate with one or more network entities via a wire-based or wireless backhaul. In some aspects, the communication device 826 may be implemented as a transceiver configured to support wire-based or wireless signal communication. This communication may involve, for example, sending and receiving: messages, parameters, or other types of information. Accordingly, in the example of FIG. 8, the communication device 826 is shown as comprising a transmitter 828 and a receiver 830. Similarly, if the apparatus 804 is not a relay access point, the communication device 820 may comprise a network interface that is configured to communicate with one or more network entities via a wire-based or wireless backhaul. As with the communication device 826, the communication device 820 is shown as comprising a transmitter 822 and a receiver 824.

The apparatuses 802, 804, and 806 also include other components that may be used in conjunction with communication adaptation operations as taught herein. The apparatus 802 includes one or more processor(s) 456 for providing functionality relating to, for example, communicating with an access point to support communication adaptation as taught herein and for providing other processing functionality. The apparatus 804 includes a processing system 834 for providing functionality relating to, for example, communication adaptation as taught herein and for providing other processing functionality. The apparatus 806 includes one or more processor(s) 482 for providing functionality relating to, for example, communication adaptation as taught herein and for providing other processing functionality. The apparatuses 802, 804, and 806 include memory devices 458, 840, and 484 (e.g., each including a memory device), respectively, for maintaining information (e.g., information indicative of reserved resources, thresholds, parameters, and so on). In addition, the apparatuses 802, 804, and 806 include user interface devices 844, 846, and 848, respectively, for providing indications (e.g., audible and/or visual indications) to a user and/or for receiving user input (e.g., upon user actuation of a sensing device such a keypad, a touch screen, a microphone, and so on).

For convenience, the apparatus 802 is shown in FIG. 8 as including components that may be used in the various examples described herein. In practice, the illustrated blocks may have different functionality in different aspects.

The components of FIG. 8 may be implemented in various ways. In some implementations, the components of FIG. 8 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 808, 832, 838, and 844 may be implemented by processor and memory component(s) of the apparatus 802 (e.g., by execution of appropriate code and/or by appropriate configuration of processor components). Similarly, some or all of the functionality represented by blocks 814, 820, 834, 840, and 846 may be implemented by processor and memory component(s) of the apparatus 804 (e.g., by execution of appropriate code and/or by appropriate configuration of processor components). Also, some or all of the functionality represented by blocks 826, 836, 842, and 848 may be implemented by processor and memory component(s) of the apparatus 806 (e.g., by execution of appropriate code and/or by appropriate configuration of processor components).

Some of the access points referred to herein may comprise low-power access points. In a typical network, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells.

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a third generation (3G) network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 9:
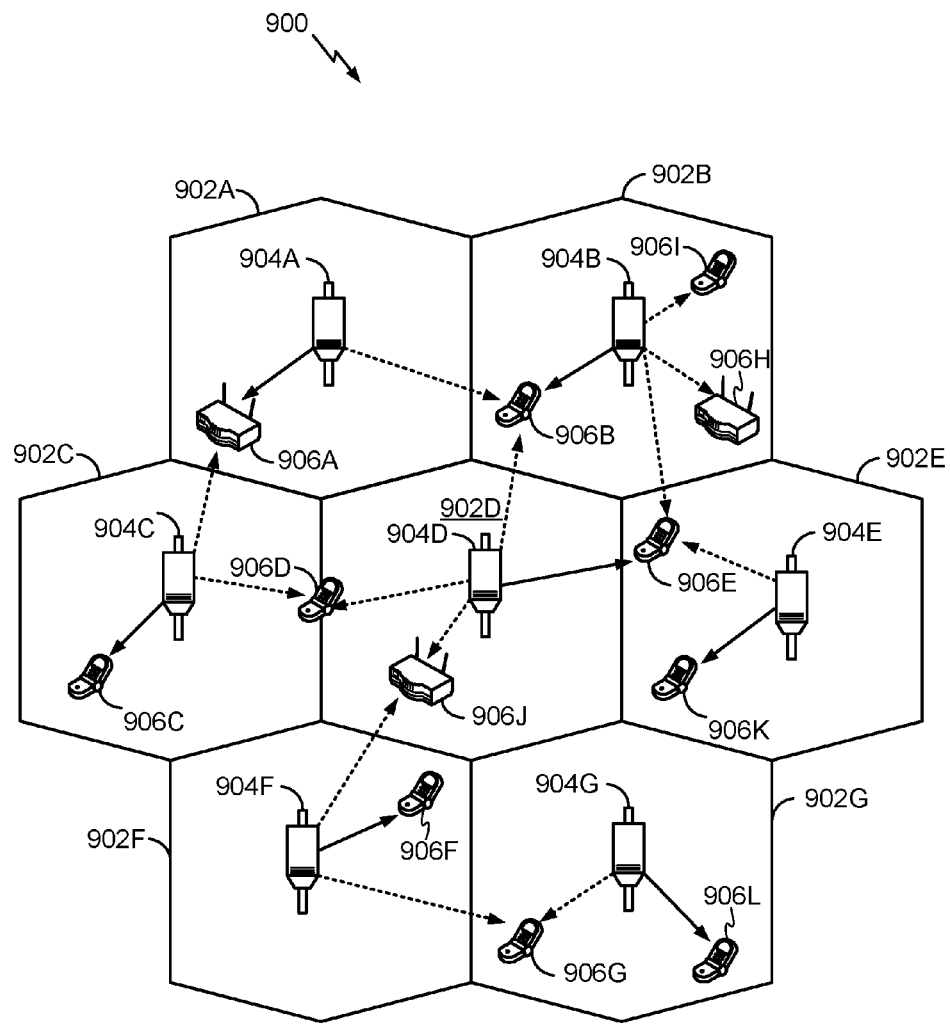
FIG. 9 is a simplified diagram of a wireless communication system.

FIG. 9 illustrates a wireless communication system 900, configured to support a number of users, including one or more access terminals and access points having respective subframe components that operate to enable the access terminal to discover and/or synchronize with the access point when the access terminal is operating in a standalone mode in an unlicensed frequency spectrum. The system 900 provides communication for multiple cells 902, such as, for example, macro cells 902A-902G, with each cell being serviced by a corresponding access point 904 (e.g., access points 904A-904G), which may correspond to network entity 404 including subframe component 460 (FIG. 4). As shown in FIG. 9, access terminals 906 (e.g., access terminals 906A-906L), which may correspond to UE 402 including subframe component 420 (FIG. 4), may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a neighborhood or several miles in a rural environment.

Figure 10:
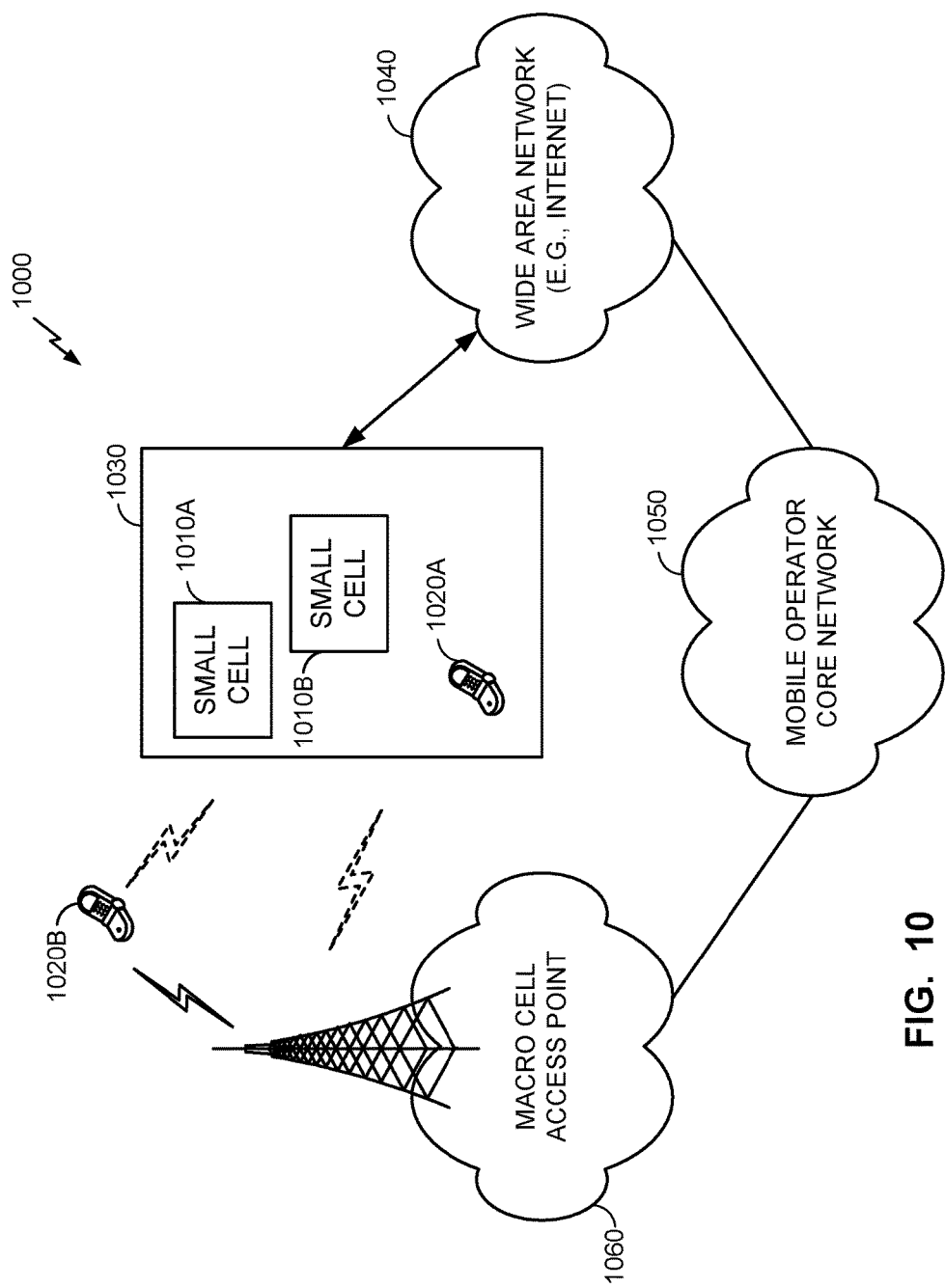
FIG. 10 is a simplified diagram of a wireless communication system including small cells.

FIG. 10 illustrates an example of a communication system 1000 where one or more small cells are deployed within a network environment. Specifically, the system 1000 includes multiple small cells 1010 (e.g., small cells 1010A and 1010B), which may correspond to network entity 404 including subframe component 460 (FIG. 4), installed in a relatively small scale network environment (e.g., in one or more user residences 1030). Each small cell 1010 may be coupled to a wide area network 1040 (e.g., the Internet) and a mobile operator core network 1050 via a DSL router, a cable modem, a wireless link, or other connectivity means (not shown). As will be discussed below, each small cell 1010 may be configured to serve associated access terminals 1020 (e.g., access terminal 1020A) and, optionally, other (e.g., hybrid or alien) access terminals 1020 (e.g., access terminal 1020B), where each access terminal may correspond to network UE 402 including subframe component 420 (FIG. 4). In other words, access to small cells 1010 may be restricted whereby a given access terminal 1020 may be served by a set of designated (e.g., home) small cell(s) 1010 but may not be served by any non-designated small cells 1010 (e.g., a neighbor's small cell 1010).

Figure 11:
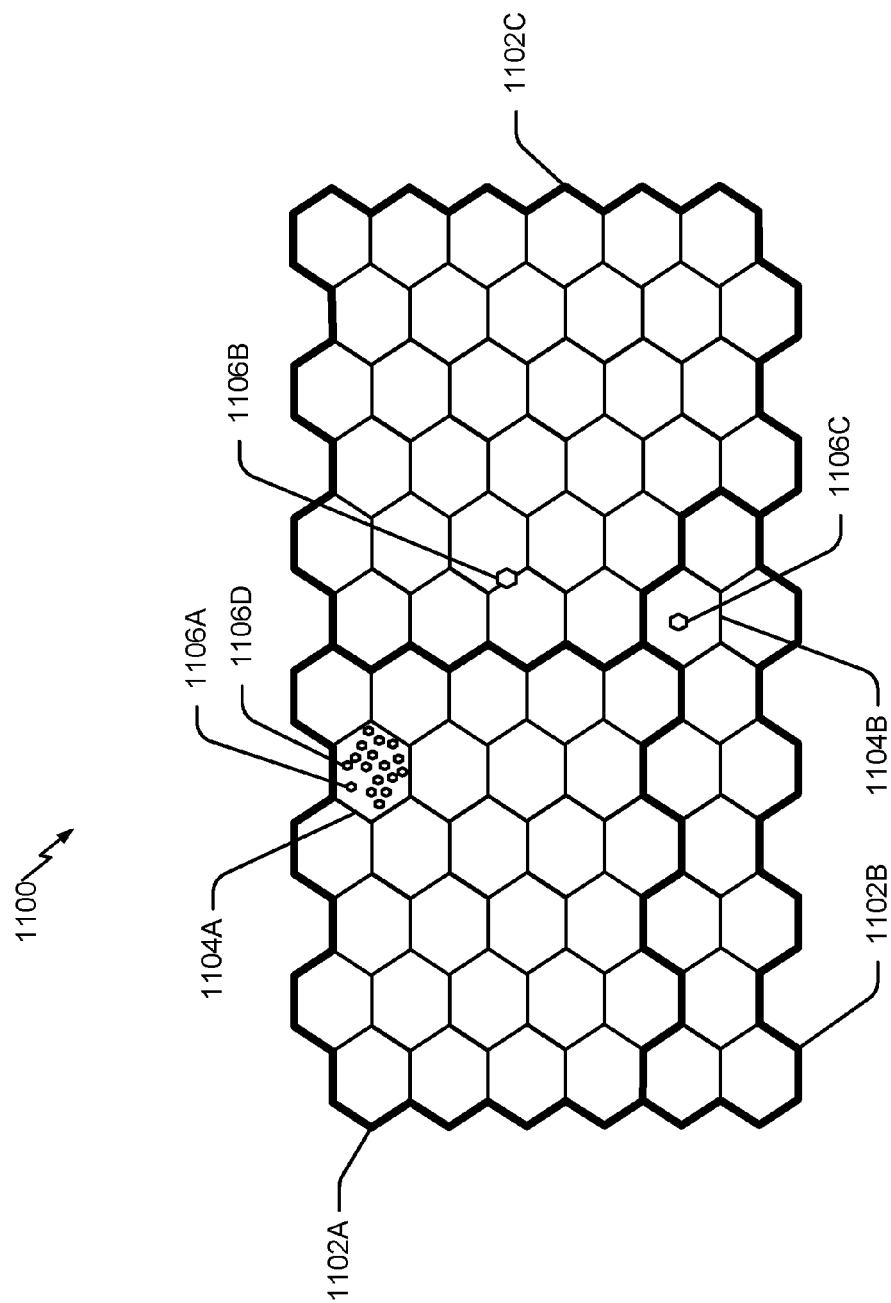
FIG. 11 is a simplified diagram illustrating coverage areas for wireless communication.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the larger hexagons. The tracking areas 1102 also include femto coverage areas 1106. In this example, each of the femto coverage areas 1106 (e.g., femto coverage areas 1106B and 1106C) is depicted within one or more macro coverage areas 1104 (e.g., macro coverage areas 1104A and 1104B). It should be appreciated, however, that some or all of a femto coverage area 1106 might not lie within a macro coverage area 1104. In practice, a large number of femto coverage areas 1106 (e.g., femto coverage areas 1106A and 1106D) may be defined within a given tracking area 1102 or macro coverage area 1104. Also, one or more pico coverage areas (not shown) may be defined within a given tracking area 1102 or macro coverage area 1104.

Referring again to FIG. 10, the owner of a small cell 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of small cells 1010 (e.g., the small cells 1010A and 1010B that reside within a corresponding user residence 1030). For example, when a subscriber is outside his home, he is served by a standard macro access point (e.g., access point 1060) and when the subscriber is at home, he is served by a small cell (e.g., small cell 1010A). Here, a small cell 1010 may be backward compatible with legacy access terminals 1020.

A small cell 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred small cell (e.g., the home small cell of the access terminal 1020) whenever such connectivity is possible. For example, whenever the access terminal 1020A is within the user's residence 1030, it may be desired that the access terminal 1020A communicate only with the home small cell 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred small cell 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 1010, the access terminal 1020 selects the small cell 1010 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 1010 that reside within the corresponding user residence 1030). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., emergency-911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
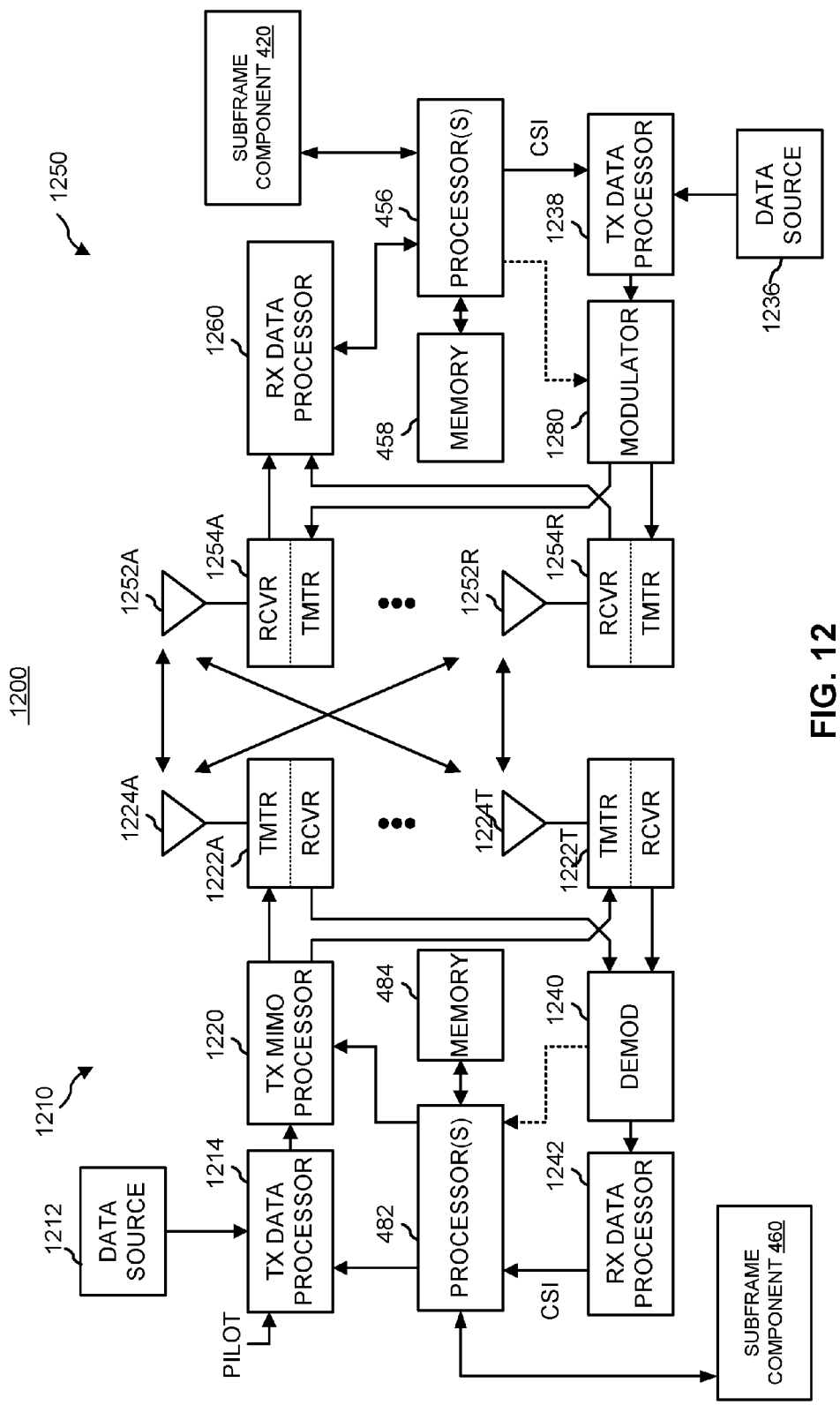
FIG. 12 is a simplified block diagram of several sample aspects of communication components.

FIG. 12 illustrates in more detail the components of a wireless device 1210, which may correspond to network entity 404 including subframe component 460 (FIG. 4), and a wireless device 1250 (e.g., a UE), which may correspond to UE 402 including subframe component 420 (FIG. 4), of a sample communication system 1200 that may be adapted as described herein. At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 482. A data memory 484 may store program code, data, and other information used by the processor 482 or other components of the device 1210.

The modulation symbols for all data streams are then provided to a TX MIMO processor 1220, which may further process the modulation symbols (e.g., for OFDM). The TX MIMO processor 1220 then provides NT modulation symbol streams to NT transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1222A through 1222T are then transmitted from NT antennas 1224A through 1224T, respectively.

At the device 1250, the transmitted modulated signals are received by NR antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the NR received symbol streams from NR transceivers 1254 based on a particular receiver processing technique to provide NT "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 456 periodically determines which pre-coding matrix to use (discussed below). The processor 456 formulates a reverse link message comprising a matrix index portion and a rank value portion. A data memory 458 may store program code, data, and other information used by the processor 456 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DE-MOD) 1240, and processed by a RX data processor 1242 to extract the reverse link message transmitted by the device 1250. The processor 482 then determines which pre-coding matrix to use for determining the beam-forming weights then processes the extracted message.

It will be appreciated that for each device 1210 and 1250 the functionality of two or more of the described components may be provided by a single component. It will be also be appreciated that the various communication components illustrated in FIG. 12 and described above may be further configured as appropriate to perform communication adaptation as taught herein. For example, the processors 482/456 may cooperate with the memories 484/458 and/or other components of the respective devices 1210/1250 to perform the communication adaptation as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for scheduling a first set of subframes in a frame duration for traffic based at least in part on a first configuration for communications in an unlicensed frequency band; scheduling, based at least in part on the first configuration, a second set of subframes in the frame duration for detection of a primary user of the unlicensed frequency band (e.g., radar detection); and adjusting a number of subframes in the first and second set of subframes based on a second configuration for communications, wherein the second configuration for communications is identified based on a type of primary user being detected (e.g., radar type). Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for wireless communications, comprising:
monitoring, at a user equipment (UE) over an unlicensed radio frequency spectrum band, for a discovery signal from a network entity on a downlink control channel, wherein the discovery signal comprises a synchronization signal and an enhanced system information block (eSIB) comprising timing information corresponding to a non-periodic current subframe location of the network entity in at least one or more of a system information block 1 (SIB1), a system information block 2 (SIB2), or a master information block (MIB);
receiving the discovery signal during a subframe from the network entity;
determining the non-periodic current subframe location of the network entity based on the discovery signal; and
demodulating the downlink control channel based on the non-periodic current subframe location.

2. The method of claim 1, wherein the discovery signal includes synchronization information corresponding to a primary synchronization signal (PSS) and a secondary synchronization signal (SSS).

3. The method of claim 1, further comprising determining a radio frame boundary (RFB) based on the non-periodic current subframe location of the network entity.

4. The method of claim 1, further comprising determining a discovery window and a discovery period based on the non-periodic current subframe location of the network entity.

5. The method of claim 4, wherein a first size of the discovery window and a second size of the discovery period are preconfigured.

6. The method of claim 4, wherein the discovery signal is received as a non-periodic opportunistic signal during the discovery window.

7. The method of claim 1, further comprising synchronizing with the network entity based on the non-periodic current subframe location corresponding to the subframe.

8. An apparatus for wireless communications, comprising:
a memory configured to store data, and
one or more processors communicatively coupled with the memory, wherein the one or more processors and the memory are configured to:
monitor at a user equipment (UE) over an unlicensed radio frequency spectrum band for a discovery signal from a network entity on a downlink control channel, wherein the discovery signal comprises a synchronization signal and an enhanced system information block (eSIB) comprising timing information corresponding to a non-periodic current subframe location of the network entity in at least one or more of a system information block 1 (SIB1), a system information block 2 (SIB2), or a master information block (MIB);
receive the discovery signal during a subframe from the network entity;
determine the non-periodic current subframe location of the network entity based on the discovery signal; and
demodulate the downlink control channel based on the non-periodic current subframe location.

9. The apparatus of claim 8, wherein the discovery signal includes synchronization information corresponding to a primary synchronization signal (PSS) and a secondary synchronization signal (SSS).

10. The apparatus of claim 8, wherein the one or more processors and the memory are further configured to determine a radio frame boundary (RFB) based on the non-periodic current subframe location of the network entity.

11. The apparatus of claim 8, wherein the one or more processors and the memory are further configured to determine a discovery window and a discovery period based on the non-periodic current subframe location of the network entity.

12. The apparatus of claim 11, wherein a first size of the discovery window and a second size of the discovery period are preconfigured.

13. The apparatus of claim 11, wherein the discovery signal is received as a non-periodic opportunistic signal during the discovery window.

14. The apparatus of claim 8, wherein the one or more processors and the memory are further configured to synchronize with the network entity based on the non-periodic current subframe location corresponding to the subframe.

15. An apparatus for wireless communications, comprising:
means for monitoring at a user equipment (UE) over an unlicensed radio frequency spectrum band for a discovery signal from a network entity on a downlink control channel, wherein the discovery signal comprises a synchronization signal and an enhanced system information block (eSIB) comprising timing information corresponding to a non-periodic current subframe location of the network entity in at least one or more of a system information block 1 (SIB1), a system information block 2 (SIB2), or a master information block (MIB);
means for receiving the discovery signal during a subframe from the network entity;
means for determining the non-periodic current subframe location of the network entity based on the discovery signal; and
means for demodulating the downlink control channel based on the non-periodic current subframe location.

16. A non-transitory computer-readable medium storing computer executable code for wireless communications, comprising:
code for monitoring at a user equipment (UE) over an unlicensed radio frequency spectrum band for a discovery signal from a network entity on a downlink control channel, wherein the discovery signal comprises a synchronization signal and an enhanced system information block (eSIB) comprising timing information corresponding to a non-periodic current subframe location of the network entity in at least one or more of a system information block 1 (SIB1), a system information block 2 (SIB2), or a master information block (MIB);

code for receiving the discovery signal during a subframe from the network entity;

code for determining the non-periodic current subframe location of the network entity based on the discovery signal; and code for demodulating the downlink control channel based on the non-periodic current subframe location.

17. A method for wireless communications, comprising:

monitoring at a user equipment (UE) over an unlicensed radio frequency spectrum band for a discovery signal from a network entity;

receiving the discovery signal during a subframe on a downlink control channel from the network entity after a clear channel assessment (CCA) procedure to establish whether a channel of the unlicensed radio frequency spectrum band is available;

determining a non-periodic current subframe location of the network entity based on the discovery signal, wherein the discovery signal includes timing information corresponding to the non-periodic current subframe location and an enhanced system information block (eSIB) comprising the timing information in at least one or more of a system information block 1 (SIB1), a system information block 2 (SIB2), or a master information block (MIB); and demodulating the downlink control channel based on the non-periodic current subframe location.

18. The method of claim 17, further comprising:

demodulating the downlink control channel; and determining a symbol location of the eSIB within the subframe in response to demodulating the downlink control channel.

19. The method of claim 17, wherein the downlink control channel corresponds to either a physical downlink control channel (PDCCH) or an enhanced downlink control channel (ePDCCH).

20. The method of claim 17, further comprising synchronizing with the network entity based on the non-periodic current subframe location corresponding to the subframe.

21. An apparatus for wireless communications, comprising:

a memory configured to store data, and one or more processors communicatively coupled with the memory, wherein the one or more processors and the memory are configured to:

monitor at a user equipment (UE) over an unlicensed radio frequency spectrum band for a discovery signal from a network entity;

receive the discovery signal during a subframe on a downlink control channel from the network entity after a clear channel assessment (CCA) procedure to establish whether a channel of the unlicensed radio frequency spectrum band is available;

determine a non-periodic current subframe location of the network entity based on the discovery signal, wherein the discovery signal includes timing information corresponding to the non-periodic current subframe location and an enhanced system information block (eSIB) comprising the timing information in at least one or more of a system information block 1 (SIB1), a system information block 2 (SIB2), or a master information block (MIB); and demodulate the downlink control channel based on the non-periodic current subframe location.

22. The apparatus of claim 21, wherein the one or more processors and the memory are further configured to:

demodulate the downlink control channel; and determine a symbol location of the eSIB within the subframe in response to demodulating the downlink control channel.

23. The apparatus of claim 21, wherein the downlink control channel corresponds to either a physical downlink control channel (PDCCH) or an enhanced downlink control channel (ePDCCH).

24. The apparatus of claim 21, wherein the one or more processors and the memory are further configured to synchronize with the network entity based on the non-periodic current subframe location corresponding to the subframe.

25. An apparatus for wireless communications, comprising:

means for monitoring at a user equipment (UE) over an unlicensed radio frequency spectrum band for a discovery signal from a network entity;

means for receiving the discovery signal during a subframe on a downlink control channel from the network entity after a clear channel assessment (CCA) procedure to establish whether a channel of the unlicensed radio frequency spectrum band is available;

means for determining a non-periodic current subframe location of the network entity based on the discovery signal, wherein the discovery signal includes timing information corresponding to the non-periodic current subframe location and an enhanced system information block (eSIB) comprising the timing information in at least one or more of a system information block 1 (SIB1), a system information block 2 (SIB2), or a master information block (MIB); and means for demodulating the downlink control channel based on the non-periodic current subframe location.

26. The apparatus of claim 25, further comprising:

means for demodulating the downlink control channel; and means for determining a symbol location of the eSIB within the subframe in response to demodulating the downlink control channel.

27. The apparatus of claim 25, wherein the downlink control channel corresponds to either a physical downlink control channel (PDCCH) or an enhanced downlink control channel (ePDCCH).

28. The apparatus of claim 25, further comprising means for synchronizing with the network entity based on the non-periodic current subframe location corresponding to the subframe.

29. A non-transitory computer-readable medium storing computer executable code for wireless communications, comprising:

code for monitoring at a user equipment (UE) over an unlicensed radio frequency spectrum band for a discovery signal from a network entity;

code for receiving the discovery signal during a subframe on a downlink control channel from the network entity after a clear channel assessment (CCA) procedure to establish whether a channel of the unlicensed radio frequency spectrum band is available;

code for determining a non-periodic current subframe location of the network entity based on the discovery signal, wherein the discovery signal includes timing information corresponding to the current subframe location and an enhanced system information block (eSIB) comprising the timing information in at least one or more of a system information block 1 (SIB1), a system information block 2 (SIB2), or a master information block (MIB); and demodulating the downlink control channel based on the current subframe location.

30. The non-transitory computer-readable medium of claim 29, further comprising:

code for demodulating the downlink control channel; and code for determining a symbol location of the eSIB within the subframe in response to demodulating the downlink control channel.

31. The non-transitory computer-readable medium of claim 29, wherein the downlink control channel corresponds to either a physical downlink control channel (PDCCH) or an enhanced downlink control channel (ePDCCH).

32. The non-transitory computer-readable medium of claim 29, further comprising code for synchronizing with the network entity based on the non-periodic current subframe location corresponding to the subframe.

\* \* \* \* \*